(12) United States Patent
Ogasawara

(10) Patent No.: US 7,586,829 B2
(45) Date of Patent: Sep. 8, 2009

(54) MULTILAYER OPTICAL RECORDING MEDIUM HAVING PLURALITY OF REFLECTING UNITS FORMED ON PARTS RECORDING LAYERS

(75) Inventor: Masakazu Ogasawara, Saitama (JP)

(73) Assignee: Pioneer Corporation, Tokyo (JP)

( * ) Notice: Subject to any disclaimer, the term of this patent is extended or adjusted under 35 U.S.C. 154(b) by 715 days.

(21) Appl. No.: 10/967,331

(22) Filed: Oct. 19, 2004

(65) Prior Publication Data

US 2005/0094507 A1 May 5, 2005

(30) Foreign Application Priority Data

Oct. 20, 2003 (JP) ............................. 2003-360037

(51) Int. Cl.
*G11B 7/24* (2006.01)

(52) U.S. Cl. .................................................. 369/275.1

(58) Field of Classification Search ............... 369/275.1, 369/275.2, 275.3, 275.4, 94; 428/64.1; 430/320, 430/321
See application file for complete search history.

(56) References Cited

U.S. PATENT DOCUMENTS

| | | | | |
|---|---|---|---|---|
| 4,450,553 A | * | 5/1984 | Holster et al. | 369/275.5 |
| 5,303,225 A | * | 4/1994 | Satoh et al. | 369/275.3 |
| 5,708,652 A | * | 1/1998 | Ohki et al. | 369/275.1 |
| 5,764,619 A | * | 6/1998 | Nishiuchi et al. | 369/275.1 |
| 5,768,251 A | * | 6/1998 | Ito et al. | 369/275.1 |
| 5,878,018 A | * | 3/1999 | Moriya et al. | 369/275.1 |
| 5,933,409 A | * | 8/1999 | Kato et al. | 369/275.1 |
| 6,160,787 A | * | 12/2000 | Marquardt et al. | 369/275.1 |
| 6,177,176 B1 | * | 1/2001 | Tanabe et al. | 428/192 |
| 6,343,060 B1 | * | 1/2002 | Ko | 369/275.1 |
| 6,456,584 B1 | * | 9/2002 | Nagata et al. | 369/275.2 |
| 6,667,947 B2 | * | 12/2003 | Maeda et al. | 369/275.1 |
| 7,095,706 B2 | * | 8/2006 | Nakamura et al. | 369/288 |
| 7,177,264 B2 | * | 2/2007 | Aratani et al. | 369/288 |
| 2002/0021656 A1 | | 2/2002 | Tsukagoshi et al. | |
| 2002/0034108 A1 | | 3/2002 | Ogasawara et al. | |
| 2005/0078594 A1 | * | 4/2005 | Takahashi et al. | 369/275.2 |
| 2005/0083798 A1 | | 4/2005 | Fujiune et al. | |
| 2005/0185542 A1 | * | 8/2005 | Iwase | 369/47.19 |
| 2007/0121449 A1 | * | 5/2007 | Taniguchi et al. | 369/47.53 |

FOREIGN PATENT DOCUMENTS

| | | |
|---|---|---|
| EP | 0 426 409 A2 | 5/1991 |
| GB | 2 017 379 A | 3/1979 |
| JP | 03-168942 A | 7/1991 |
| JP | 03-219440 A | 9/1991 |
| JP | 08-180413 A | 7/1996 |
| JP | 09-022542 A | 1/1997 |
| JP | 11-126335 A | 5/1999 |
| JP | 2002-025098 A | 1/2002 |

(Continued)

*Primary Examiner*—Tan X Dinh
(74) *Attorney, Agent, or Firm*—Foley & Lardner LLP

(57) ABSTRACT

A multilayer optical recording medium includes a plurality of recording layers that are laminated and have recording layer forming units into which information is recorded. Reflective film forming units are formed on parts of the respective recording layers and have a reflectance ratio sufficient to make a servo loop of a focus servo into a servo close condition. Reflective film forming units of the respective recording layers are arranged at respectively different positions.

17 Claims, 17 Drawing Sheets

FOREIGN PATENT DOCUMENTS

| | | |
|---|---|---|
| JP | 2002-050053 A | 2/2002 |
| JP | 2002-222527 A | 8/2002 |
| JP | 2003-141739 A | 5/2003 |
| JP | 2003-233909 A | 8/2003 |
| JP | 2003-242677 A | 8/2003 |
| JP | 2003-257069 A | 9/2003 |
| WO | WO 01/41131 A2 | 6/2001 |
| WO | WO 03/063150 A1 | 7/2003 |

* cited by examiner

< FOCUS ERROR AT POSITION A >

< FOCUS ERROR AT POSITION B >

MULTILAYER OPTICAL RECORDING MEDIUM HAVING PLURALITY OF REFLECTING UNITS FORMED ON PARTS RECORDING LAYERS

BACKGROUND OF THE INVENTION

1) Field of the Invention

The present invention relates to a multilayer optical recording medium having multilayer recording layers and an optical pickup device that records and replays the multilayer optical recording medium.

2) Description of the Related Art

In an optical recording medium such as a digital versatile disk (DVD), two layers of recording layer are formed, which allows for both a high recording density and a high capacity. To further increase the capacity of optical recording medium using an optical system of a higher NA (Numerical Aperture) and a light source of a short wavelength, a multilayer optical disk having three or four layers of recording layers has been proposed. In such an optical disk having several layers of recording layers, a spacer area is formed between a recording layer and another recording layer, and a semitransparent reflective film is formed on the entire surface of each recording layer.

Meanwhile, in recent years, to achieve still higher recording density and higher capacity in optical recording medium, the basic technology has been developed of a three-dimensional multilayer optical memory as a next generation optical recording medium having recording layers from around 10 layers to around 100 layers. As the recording layers of this three-dimensional multilayer optical memory, a photo polymer is employed that does not have a reflective film.

In the conventional multilayer optical memory, a structure is employed where a reflective film is not arranged on each recording layer, so as to reduce transmission loss of light for recording and reproducing at a maximum. Therefore, the reflectance ratio of each recording layer becomes the same as viewed from the side of a recording pickup. In addition, in this optical memory, to restrict as much as possible the influence of spherical aberration, the thickness is made extremely small of an intermediate layer (space area) that is formed between recording layers, i.e., interlayer space.

In the conventional optical memory with no reflective film in each recording layer, it is difficult to make a servo loop of a focus servo into a servo close condition at the side of a recording and reproducing device. Furthermore, because a reflective film is not formed on each recording layer and the interlayer space between recording layers is small, a focus error signal cannot be separated between layers, and it is difficult to make an interlayer jump that moves between layers (focus jump). Therefore, making a servo loop of a focus servo into a servo close condition and move control between layers are the issues that need consideration.

SUMMARY OF THE INVENTION

It is an object of the present invention to solve at least the problems in the conventional technology.

A multilayer optical recording medium according to an aspect of the present invention includes a plurality of recording layers formed as a laminate, each recording layer having a recording layer forming unit on which information is recorded. Reflective film forming units, which have a higher reflectance ratio than that of the recording layer forming units, are formed on parts of the recording layers.

An optical pickup device according to another aspect of the present invention irradiates light from a light source via an objective lens to the above multilayer optical recording medium and receives light reflected form the multilayer optical recording medium using a signal detecting unit. The optical pickup device includes a focus servo unit that controls focus servo of the objective lens on the basis of a focus error signal; and a controlling unit that controls making a servo loop of a focus servo into a servo close condition in each recording layer of the multilayer optical recording medium by use of the reflective film forming units of the respective recording layers.

An optical pickup device according to still another aspect of the present invention irradiates light from a light source via an objective lens to the above multilayer optical recording medium and receives light reflected form the multilayer optical recording medium using a signal detecting unit. The optical pickup device includes a focus servo unit that controls focus servo of the objective lens on the basis of a focus error signal; a tracking servo unit that controls tracking servo of the objective lens on the basis of a tracking error signal; and a controlling unit that changes over the focus servo gain in the focus servo control at the recording layer forming units of the multilayer optical recording medium and the tracking servo gain in the tracking servo control so that the respective servo gains are larger than the respective servo gains at the reflective film forming units.

An information reproducing device according to still another aspect of the present invention includes the above optical pickup device; and a demodulating unit that demodulates a detection signal of the signal detecting unit of the optical pickup device.

A method according to still another aspect of the present invention is a method for manufacturing a multilayer optical recording medium wherein a plurality of recording layers are laminated. The method includes depositing a reflective film onto an intermediate layer sheet where a mask pattern is laminated thereon to form reflective film forming units on part of the intermediate layer sheet; first laminating and jointing a recording layer sheet onto the intermediate layer sheet on which the reflective film has been formed; second laminating a plurality of sheets of the jointed intermediate layer sheet and the recording layer sheet so that the reflective film forming units thereof are in a specified arrangement relation between respective layers; and sandwiching the second laminated sheets between a substrate layer sheet and a protection layer sheet and jointing them.

The other objects, features, and advantages of the present invention are specifically set forth in or will become apparent from the following detailed description of the invention when read in conjunction with the accompanying drawings.

DETAILED DESCRIPTION

Exemplary embodiments of a multilayer optical recording medium and an optical pickup device according to the present invention are explained in more detail in reference to the accompanying drawings.

Figure 1:
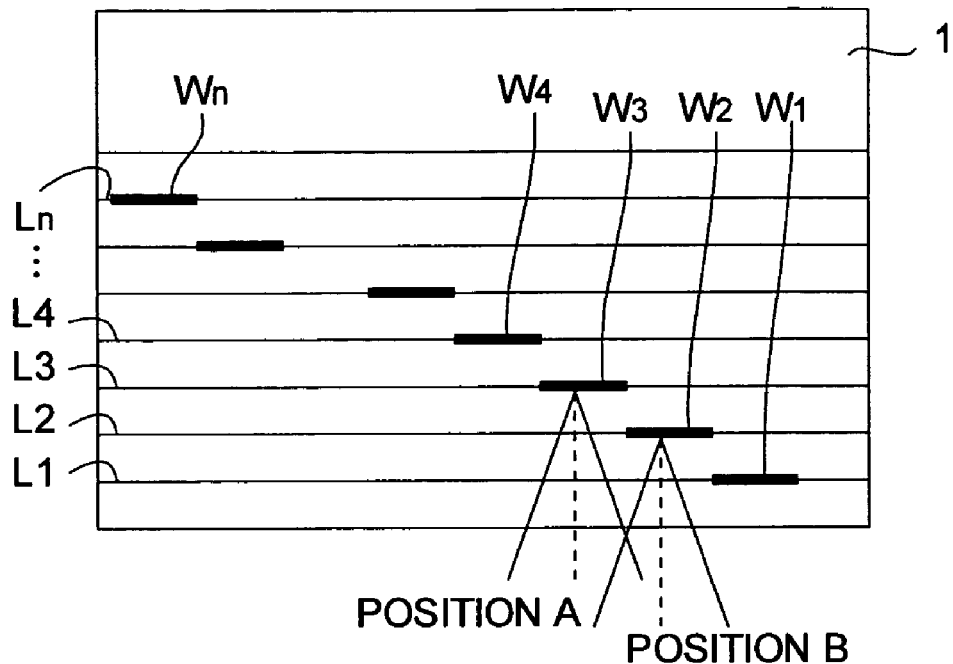
FIG. 1 is a schematic of a multilayer optical recording medium according to an embodiment of the present invention.

FIG. 1 is a schematic of a multilayer optical recording medium (hereinafter, "optical media") according to an embodiment of the present invention. In this optical media, on a transparent substrate 1, many recording and reproducing layers (hereinafter, referred to simply as recording layers) L1, L2, L3, . . . , Ln are formed. A first recording layer is referred to as L1, a second recording layer as L2, . . . , and a n-th recording layer is referred to as Ln. On parts of the respective recording layers L1 to Ln of the optical media, reflective film forming units W1, W2, W3, . . . , Wn are formed of a circular shape, rectangular shape and the like, having a reflectance ratio sufficient to make a servo loop of a focus servo into a servo close condition. Making a servo loop of a focus servo into a servo close condition means an action to make the status where a focus servo is not working according to a focus error signal into the status where the focus servo is working.

The reflective film forming units W1 to Wn are arranged at least at one unit (plural units also available) of each of the recording layers L1 to Ln. In this case, when an X axis and a Y axis are set in the direction parallel with the recording layers L1 to Ln, the respective reflective film forming units W1 to Wn are arranged in the X and Y positions that do not overlap the reflective film forming units of other recording layers when viewed from an optical pickup. Namely, the reflective film forming units W1 to Wn of each of the recording layers L1 to Ln are arranged on respectively different X and Y positions.

In the optical media, markings or notches (not illustrated therein) are arranged to specify the standard position thereof, and the respective reflective film forming units W1 to Wn are arranged, for example, according to a preset specific rule from the specific standard position of the optical media. Therefore, at the side of an optical pickup, the standard position is specified in recognition of the markings and notches, then the optical pickup is moved by specified amounts in the X and Y directions that are determined according to the specific rule from the standard position. As a result, it is possible to move the optical pickup to the position corresponding to the reflective film forming units W1 to Wn of a desired recording layer.

Figure 2:
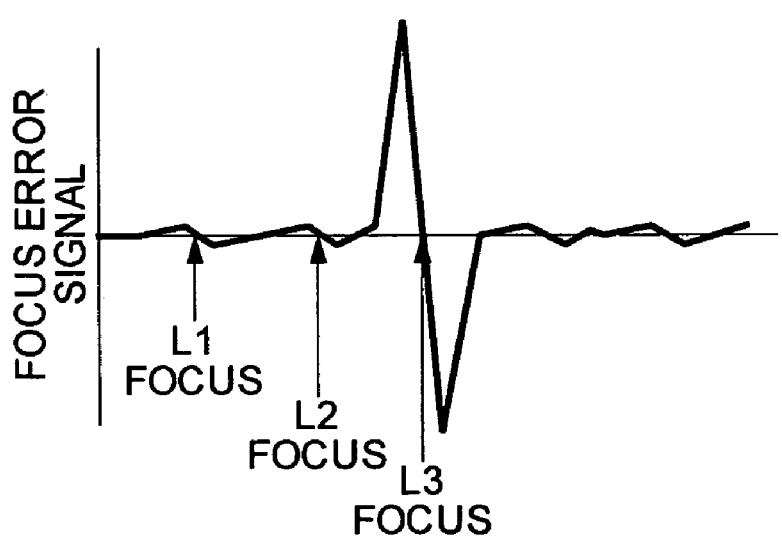
FIG. 2 is a waveform of a focus error signal at the position A in the multilayer optical recording medium shown in FIG. 1.
Figure 3:
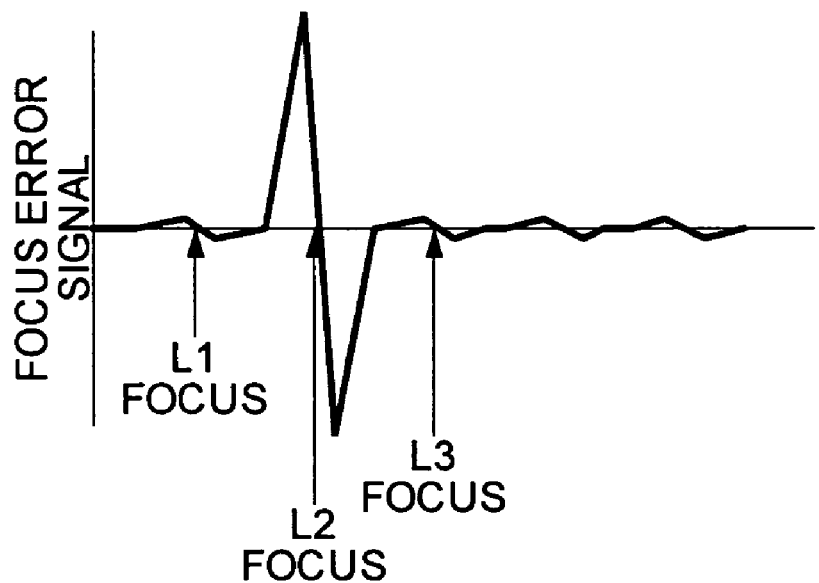
FIG. 3 is a waveform of a focus error signal at the position B in the multilayer optical recording medium shown in FIG. 1.

FIG. 2 is a waveform of a focus error signal at the moment when the objective lens of the optical pickup is arranged on the position A in X and Y directions where there is the reflective film forming unit W3 on the third recording layer L3, and the objective lens is moved from a position away from the optical media of FIG. 1 to a position close to the optical media. FIG. 3 is a waveform of a focus error signal at the moment when the objective lens of the optical pickup is arranged on the position B where there is the reflective film forming unit W2 on the second recording layer L2, and the objective lens is moved from a position away from the optical media of FIG. 1 to a position close to the optical media.

The optical pickup is arranged at the side of the first recording layer L1. The focus error signal basically shows zero level at a focused status where the focus of the objective lens is focused onto a recording surface (more precisely, in this case, at a zero cross point from the maximum point to the minimum point), and draws an S-shaped curve with the zero level from the maximum point to the minimum point as the focused point at the center thereof. Then, the area from the maximum point to the minimum point in one S-shaped curve is roughly the area where a focus servo is worked, namely, a focus servo loop is closed.

In the position A, the reflective film forming unit W3 exists on the third recording layer L3. Therefore, in the focus error signal shown in FIG. 2, the signal level thereof and the level change becomes large when the focus position of the objective lens is near the third recording layer L3. In the position B, the reflective film forming unit W2 exists on the second recording layer L2. Therefore, in the focus error signal shown in FIG. 3, the signal level thereof becomes large when the focus position of the objective lens is near the second recording layer L2.

Accordingly, by use of the S-shaped portion where the signal level change appears large, it is possible to easily make a servo loop of a focus servo into a servo close condition on the respective recording layers L1 to Ln, by use of existing technologies employed in a DVD or a CD. Namely, when moved to a certain recording layer, the focus servo is released once, and the focus is moved to the position where there is a reflective film forming unit of a recording layer of the move destination. Spherical aberration that is supposed to occur at the targeted recording layer is compensated. Thereafter, a process is performed to set the focus servo on the recording layer of the move destination. In FIG. 2 and FIG. 3, as for the focus error signal at the moment when the focus point of the objective lens is positioned on another recording layer where the reflective film forming unit W3 does not exist, the level change thereof is extremely small. Therefore, it is very difficult to make a servo loop of a focus servo into a servo close condition by use of this unit.

Figure 4:
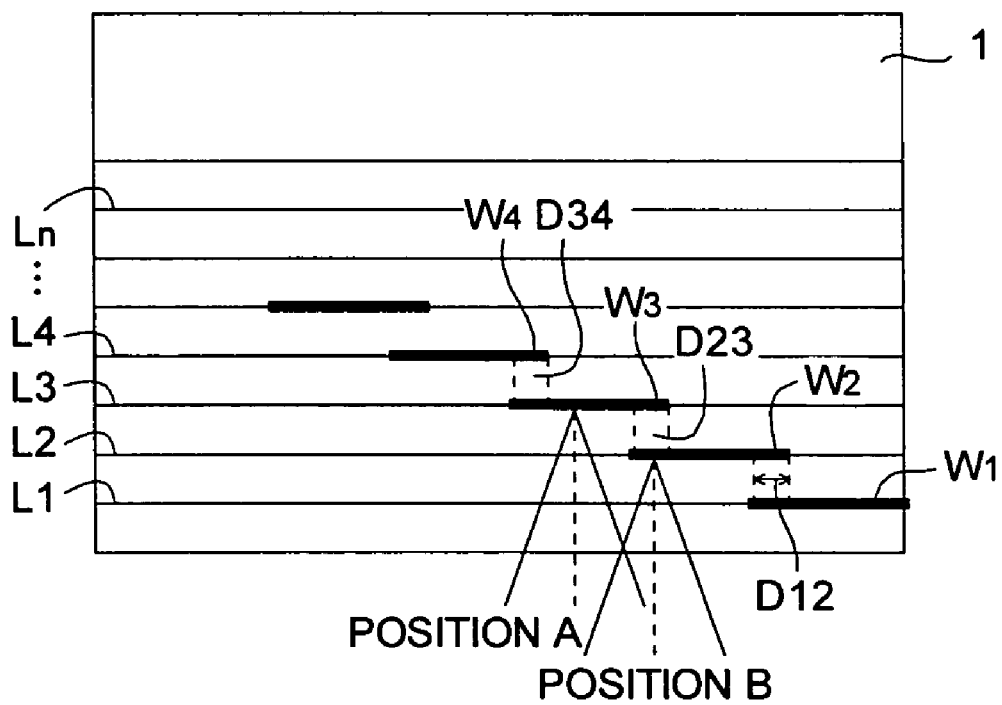
FIG. 4 is a schematic of a multilayer optical recording medium according to another embodiment of the present invention.

FIG. 4 illustrates another embodiment of an optical media. In this optical media, the reflective film forming units W1 to Wn of the recording layers L1 to Ln that are adjacent to each other are arranged so that parts thereof overlap each other when viewed from the side of the optical pickup. For example, the reflective film forming unit W1 of the first recording layer L1 and the reflective film forming unit W2 of the second recording layer L2 overlap each other in the area D12, the reflective film forming unit W2 of the second recording layer L2 and the reflective film forming unit W3 of the third recording layer L3 overlap each other in the area D23, and the reflective film forming unit W3 of the third recording layer L3 and the reflective film forming unit W4 of the fourth recording layer L4 overlap each other in the area D34.

Figure 5:
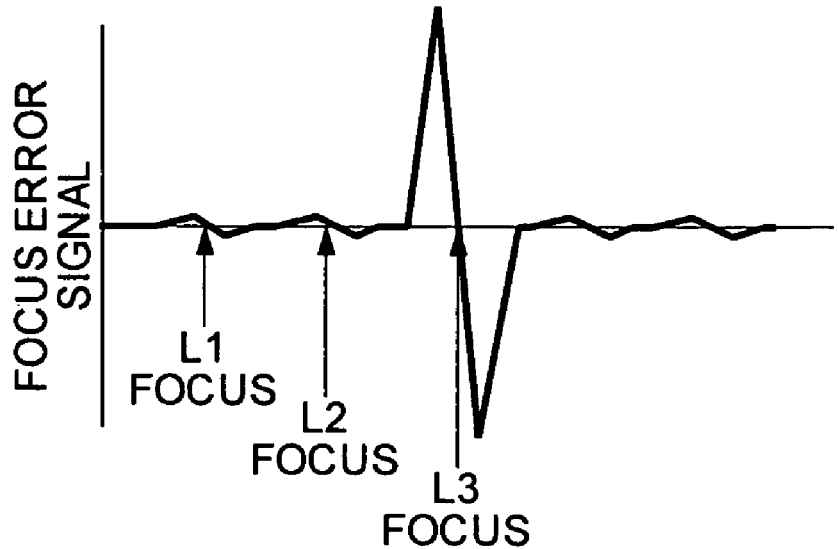
FIG. 5 is a waveform of a focus error signal at the position A in the multilayer optical recording medium shown in FIG. 4.
Figure 6:
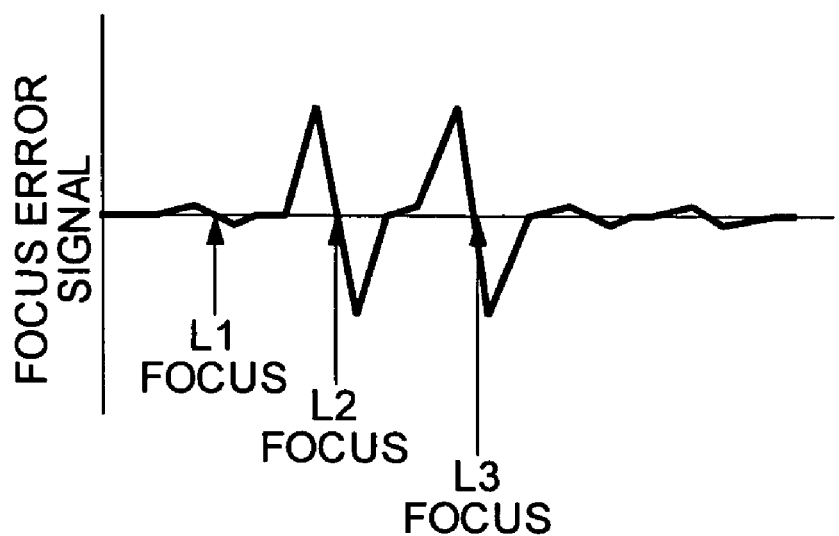
FIG. 6 is a waveform of a focus error signal at the position B in the multilayer optical recording medium shown in FIG. 4.

FIG. 5 is a waveform of a focus error signal at the moment when the objective lens of the optical pickup is arranged on the position A in the X and Y directions where there is the reflective film forming unit W3 on the third recording layer L3, and the objective lens is moved from a position away from the optical media of FIG. 4 to a position close to the optical media. FIG. 6 is a waveform of a focus error signal at the moment when the objective lens of the optical pickup is arranged on the position B corresponding to the area D23 where the reflective film forming unit W2 of the second recording layer L2 and the reflective film forming unit W3 of the third recording layer L3 overlap each other, and the objective lens is moved to a position close to the optical media shown in FIG. 4.

As shown in FIG. 5, when the pickup is positioned at the position A, the reflective film forming unit W3 only exists on the third recording layer L3. Therefore, in the same manner as in FIG. 2 or FIG. 3, the signal level thereof and the level change become large when the focus position of the objective lens is near the third recording layer L3. Accordingly, by use of the S-shaped portion where the signal level change appears large, it is possible to easily make a servo loop of a focus servo into a servo close condition on the respective recording layers L1 to Ln in the same manner explained previously.

Meanwhile, as shown in FIG. 6, when the pickup is positioned on the position B, because the reflective film forming unit W3 of the third recording layer L3 and the reflective film forming unit W4 of the fourth recording layer L4 are in the focus error signals, two S-shaped portions occur continuously where the signal level change appears large. Namely, in the case of the optical media shown in FIG. 4, because the respective reflective film forming units W1 to Wn are arranged so that parts thereof overlap each other, by use of the overlapped units, even if the interlayer space between the respective recording layers is small, it becomes possible to separate the focus error signal between the respective recording layers. Accordingly, in this case, when an interlayer jump is made from the third recording layer L3 to the fourth recording layer L4, the normal focus jump procedures that are used in a DVD may be employed. In the focus jump procedures, a series of processes is performed, such as opening the focus servo loop, output of a kick pulse for move to a target layer, detection of approach to the target layer on the basis of monitoring the focus error signal, output of a brake pulse, and closing the focus servo loop.

Figure 7:
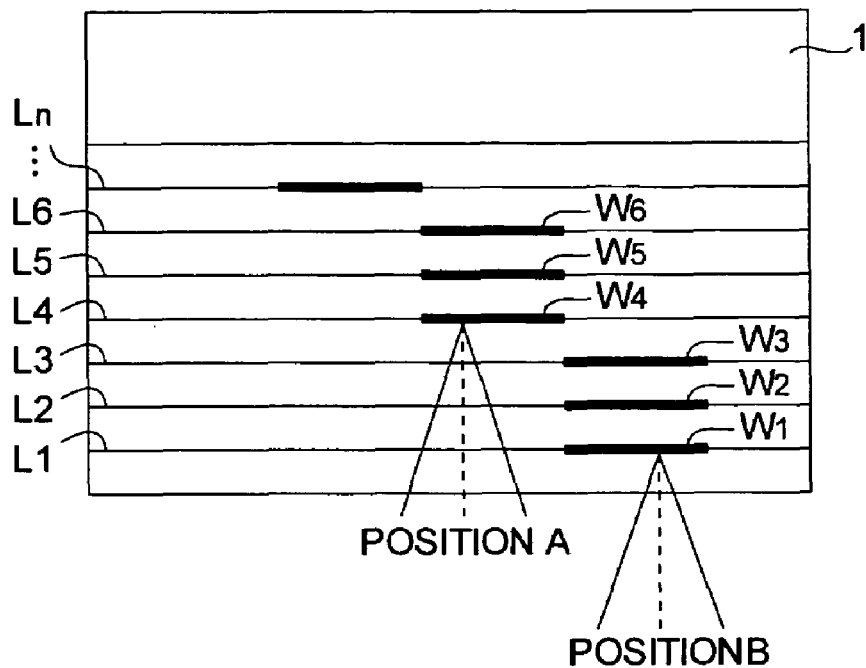
FIG. 7 is a schematic of a multilayer optical recording medium according to still another embodiment of the present invention.

FIG. 7 is a schematic of yet another optical media. In the optical media shown in FIG. 7, the reflective film forming units are almost completely overlapped in adjacent plural (several) recording layers. In this case, the reflective film forming unit W1 of the first recording layer L1, the reflective film forming unit W2 of the second recording layer L2, and the reflective film forming unit W3 of the third recording layer L3 are made into almost the same size and shape, and are arranged in almost the same X and Y positions. Further, the reflective film forming unit W4 of the fourth recording layer L4, the reflective film forming unit W5 of the fifth recording layer L5, and the reflective film forming unit W6 of the sixth recording layer L6 are made into almost the same size and shape, and are arranged in almost the same X and Y positions. The arranged positions of the reflective film forming units W1 to W3 are different from those of the reflective film forming units W4 to W6.

More concretely, in the optical media shown in FIG. 7, with plural recording layers that are continuously adjacent as one group, the respective recording layers are divided into plural groups, so that the reflective film forming units of plural recording layers belonging to a same group should be arranged at the same position, and reflective film forming units belonging to different groups should be arranged at different positions.

Figure 8:
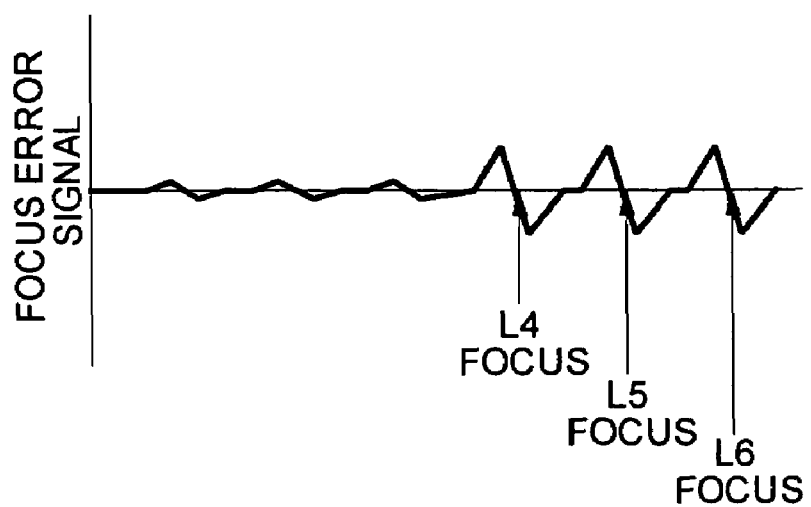
FIG. 8 is a waveform of a focus error signal at the position A in the multilayer optical recording medium shown in FIG. 7.
Figure 9:
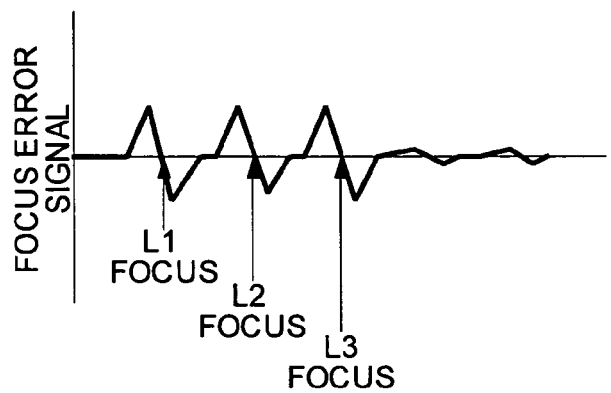
FIG. 9 is a waveform of a focus error signal at the position B in the multilayer optical recording medium shown in FIG. 7.

FIG. 8 is a waveform of a focus error signal at the moment when the objective lens of the optical pickup is arranged on the position A in X and Y directions where there are the reflective film forming units W4 to W6, and the objective lens is moved closer to the optical media shown in FIG. 7. FIG. 9 is a waveform of a focus error signal at the moment when the objective lens of the optical pickup is arranged on the position B in X and Y directions where there are the reflective film forming units W1 to W3, and the objective lens is moved closer to the optical media shown in FIG. 7.

In the optical media shown in FIG. 7, the reflective film forming units are overlapped in plural recording layers that are continuously adjacent (in a unit of one group). Therefore, as shown in FIG. 8 and FIG. 9, in a focus error signal, plural pieces (three pieces in this case) of S-shaped portions occur continuously where the signal level change appears large. Accordingly, in this case, when to carry out recording and reproducing to, for example, the fifth recording layer L5 or the sixth recording layer L6, the focus is moved from an away position to a position close to the recording surface, the focus is positioned once near the fourth recording layer L4, and thereafter, the focus servo is closed. Then, the focus jump procedures explained previously are carried out, so that an interlayer jump may be made from the fourth recording layer L4 to the adjacent fifth recording layer L5 or the sixth recording layer L6. As mentioned above, in the optical media shown in FIG. 7, by making the most of the efficient focus jump procedures, access may be made to each recording layer. The reflective film forming units W1 to Wn formed on partial areas of layers may be arranged at the same X and Y positions through all the layers, and movement to each recording layer may be made by use of the focus jump procedures. Further, as the shapes of the optical disk, arbitrary shapes may be employed such as a rectangular shape, circular shape, other polygonal shape, oval shape and so forth.

A first embodiment of the present invention is explained hereinafter in reference to FIGS. 10 to 16. In this first embodiment, an optical media 10 of a card type in a rectangular shape is employed.

Figure 10:
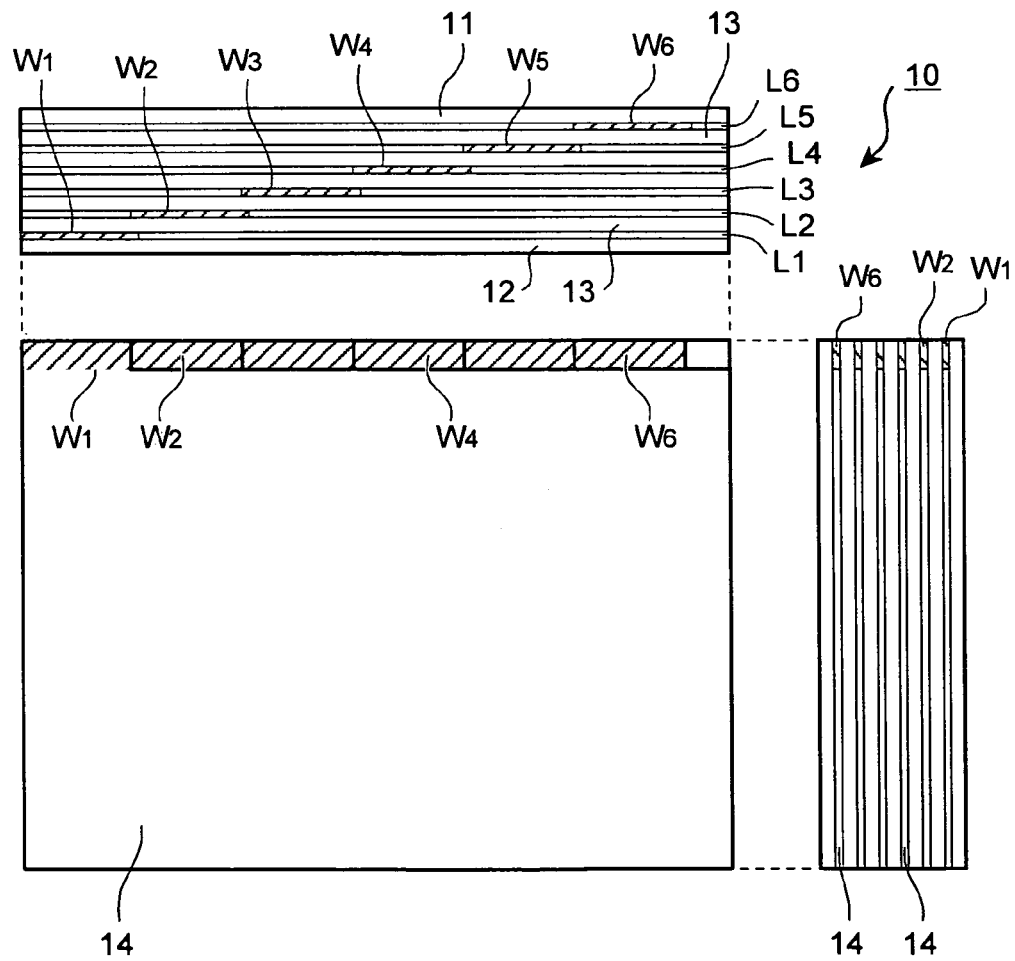
FIG. 10 is a schematic of a card type optical media as a multilayer optical media according to a first embodiment of the present invention.

FIG. 10 is a schematic of the optical media 10 according to the first embodiment. In this optical media 10, between a substrate layer 11 and a protection layer 12, many recording layers L1 to L6 (six layers in this case) and intermediate layers 13 are laminated. On partial areas of the respective recording layers L1 to L6, reflective film forming units (hereinafter, index units) W1 to W6 are formed having a rectangular shape of a specified size and having a reflective characteristic of a high reflectance ratio. In the respective recording layers L1 to L6, areas other than the reflective film forming units W1 to W6 include a recording film forming unit 14 where information recording and reproducing are performed. The reflective film forming units W1 to W6 have a higher reflectance ratio than that of the recording layer forming unit 14.

In this case, the reflective film forming units W1 to W6 are arranged like tabs in a line at the edge unit of the optical media 10. The reflective film forming units W1 to W6 of the adjacent recording layers L1 to Ln are arranged so that parts thereof are overlapped when viewed from the side of the optical pickup. In this first embodiment, the reflective film forming units W1 to W6 adopt the arrangement method similar to that of the optical media of the embodiment shown in FIG. 4. Because the reflective film forming units W1 to W6 are arranged at the edge unit of the optical media 10, at the moment of access to the recording layers, the reflective film forming units W1 to W6 will not become obstacles. Therefore, the recording areas of the recording layers may be used effectively.

In the respective index units W1 to W6, layer identification address information, which shows on which layer the index unit concerned is located, various information concerning any one of recording and reproducing or both (spherical aberration precise compensation information, light strategy information, and optimized recording and reproducing laser output information) and so forth are memorized. Therefore, by use of this record information, it becomes possible to confirm the recording layers, finely adjust and set the spherical aberration of the pickup, focus servo target value and so forth.

Spherical Aberration Precise Compensation Information

When the compensation of spherical aberration is carried out at the moment of determination of a target recording layer by use of a compensation value memorized previously in a memory of a pickup device, an aberration correcting device is driven, such as a beam expander or a liquid crystal element. However, in some cases, the cover layer thickness to the target record layer may be different owing to manufacturing fluctuations of an optical media. Therefore, if the spherical aberration precise compensation information per each optical media is recorded into the index units, and at the moment of spherical aberration compensation, compensation is performed by use of this spherical aberration precise compensation information. As a consequence, a precise spherical aberration compensation may be carried out.

Layer Identification Address Information

If the optical pickup is moved to the position where there are the index units W1 to W6 in an optical media, and then action control to work a focus servo is carried out, the focus servo may always be worked onto a required recording layer. In some cases, however, the focus servo cannot be worked onto a required layer owing to vibration or some external disturbance. In such a case, by use of the layer identification address information recorded in the index units W1 to W6, it is possible to confirm whether the current layer is the required recording layer.

Optimized Recording and Reproducing Laser Output Information

Because this optical media 10 is a multilayer structure, there may be a case where laser output necessary for optimized recording and reproducing varies in the recording layers. This may occur owing to different recording sensitivity in the layers resulting from production unevenness, or owing to a different transmission ratio difference of the laser beam between a layer at the depth and a layer at the front when viewed from the side of the pickup. Therefore, optimized recording and reproducing laser output information showing the optimized recording and reproducing laser output per layer is recorded in the index units W1 to W6, and at recording and reproducing, on the basis of the optimized recording and reproducing laser output information per layer recorded in the index units W1 to W6, laser power is controlled per layer. Thereby, it is possible to perform recording and reproducing at high precision in each recording layer.

Light Strategy Information

In optical recording (especially in the case where a phase change medium or a pigment medium is used), to reduce distortion of a record mark owing to heat, and to reduce jitters, multi pulse modulation called light strategy is carried out and thereby thermal distribution control of record marks is carried out. A multi-pulse modulation pattern (light strategy information) varies with the sensitivity and recording power of the optical media. Therefore, it is necessary to have light strategy information per layer. Namely, at recording, multi-pulse modulation control of the laser is carried out per layer on the basis of the light strategy information per layer recorded in the index units W1 to W6. Thereby, mark recording may be carried out at high precision in each recording layer.

The layer identification address information, optimized recording and reproducing laser output information, and light strategy information are respectively information peculiar to each layer. Therefore, it is useful to form a stamper peculiar to each layer, and a mark peculiar to each layer.

In addition, as the spherical aberration precise compensation information, a mark or a pit having no information may be formed on an index unit, and this pit may be replayed at the side of an optical pickup. Further, the amplitude information and error rate, jitters and so forth thereof may be measured, and on the results of this measurement, evaluation information as spherical aberration precise compensation information may be created. By use of this evaluation information, precise compensation of spherical aberration may be carried out. In this case, since this spherical aberration precise compensation information becomes information not particular to each recording layer, by use of what is formed previously on a stamper or so, a same mark or pit may be formed on each layer. Further, to create evaluation information of the spherical aberration precise compensation information, the layer identification address information, light strategy information, and optimized recording and reproducing laser output information may be replayed, and the amplitude information, error rate, jitters and so forth thereof may be measured. Thereby, the evaluation information may be prepared.

Figure 11:
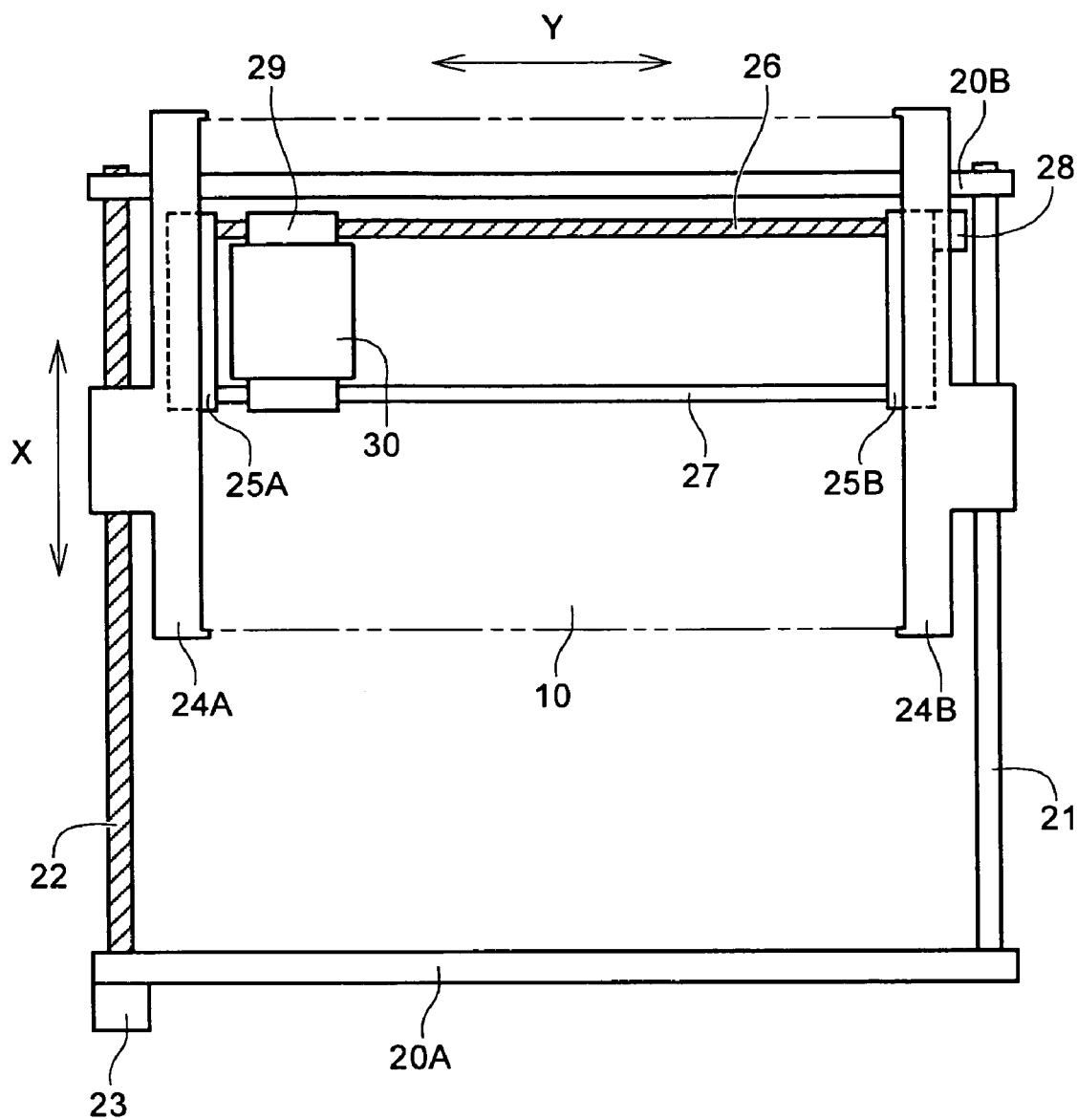
FIG. 11 is a schematic of a holding and driving mechanism of the card type optical media shown in FIG. 10.

FIG. 11 is a schematic of a holding and driving mechanism of a card type optical media 10 in a recording and reproducing device. The media holding and driving mechanism adopts an X-Y driving table method, and a ball screw 22 is interconnected with a pair of frame bodies 20A and 20B that are fixed onto the device main body, and a guide bar 21 is fixed thereto.

At one end of the ball screw 22, the rotating shaft of a step motor 23 is interconnected. One card holder 24A is engaged to the ball screw 22, and the other card holder 24B is inserted to the guide bar 21. The card holders 24A and 24B support the card type optical media 10.

Meanwhile, in between a pair of supporting bodies 25A and 25B fixed to the device main body, a ball screw 26 is interconnected, and a guide bar 27 is fixed thereto. To one end of the ball screw 26, the rotating shaft of a step motor 28 is interconnected. In between the ball screw 26 and the guide bar 27, a pickup holding unit 29 is arranged. The pickup holding unit 29 supports an optical pickup 30.

According to this media holding and driving mechanism, when the step motor 23 is rotated, the card type optical media 10 supported by the card holders 24A and 24B moves in the X direction. Meanwhile, when the step motor 28 is rotated, the optical pickup 30 moves in the Y direction.

Figure 12:
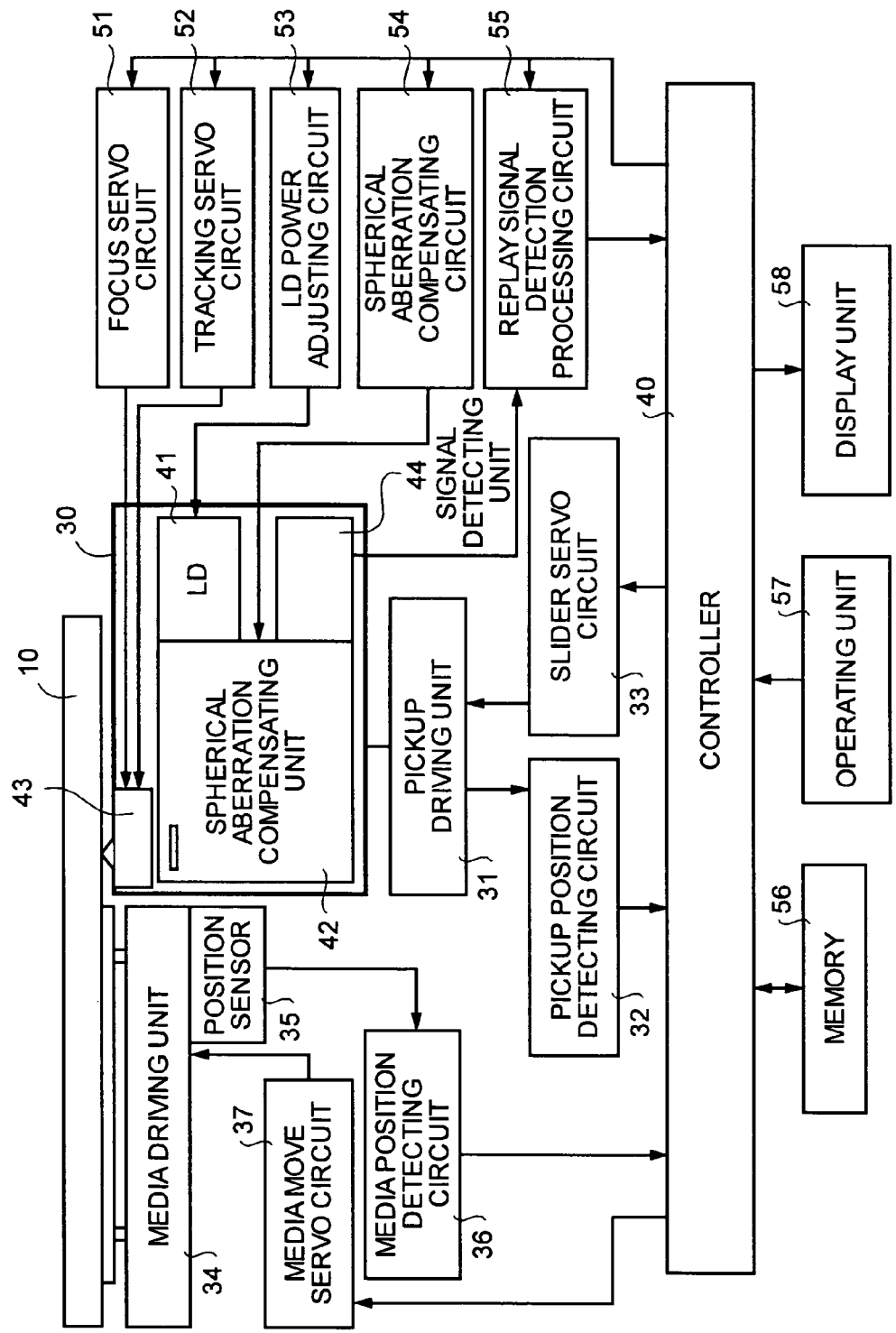
FIG. 12 is a block diagram of a control structure of the recording and reproducing device according to the first embodiment.

FIG. 12 is a block diagram of the entire structure of a recording and reproducing device that records and replays the card type optical media 10. This recording and reproducing device has an optical pickup 30, a pickup driving unit 31 that drives the optical pickup in the Y direction, a pickup position detecting circuit 32 that detects the position of the optical pickup 30 in the Y direction and inputs the detection signal to a controller 40, and a slider servo circuit 33 that servo controls the movement of the optical pickup 30 in the Y direction according to instructions from the controller 40. The step motor 28, the ball screw 26, the guide bar 27, the pickup holding unit 29, and the like in FIG. 11 correspond to the pickup driving unit 31.

In addition, the recording and reproducing device has a media driving unit 34 that drives the card type optical media 10 in the X direction, a position sensor 35 that detects the position of the card type optical media 10 in the X direction, a media position detecting circuit 36 that detects the position of the card type optical media 10 in the X direction on the basis of detection output of the position sensor 35, and a media move servo circuit 37 that controls the movement of the card type optical media 10 in the X direction according to instructions from the controller 40. The step motor 23, the ball screw 22, the guide bar 21 and the like in FIG. 11 correspond to the media driving unit 34.

The optical pickup 30 has a light source 41 such as a laser diode (LD), a spherical aberration compensating unit 42, an objective lens driving unit 43, a signal detecting unit 44, and so forth. The objective lens driving unit 43 has a focus actuator that moves an objective lens 48 in the optical axis direction thereof, and a tracking actuator that moves the objective lens 48 in the tracking direction.

Figure 13:
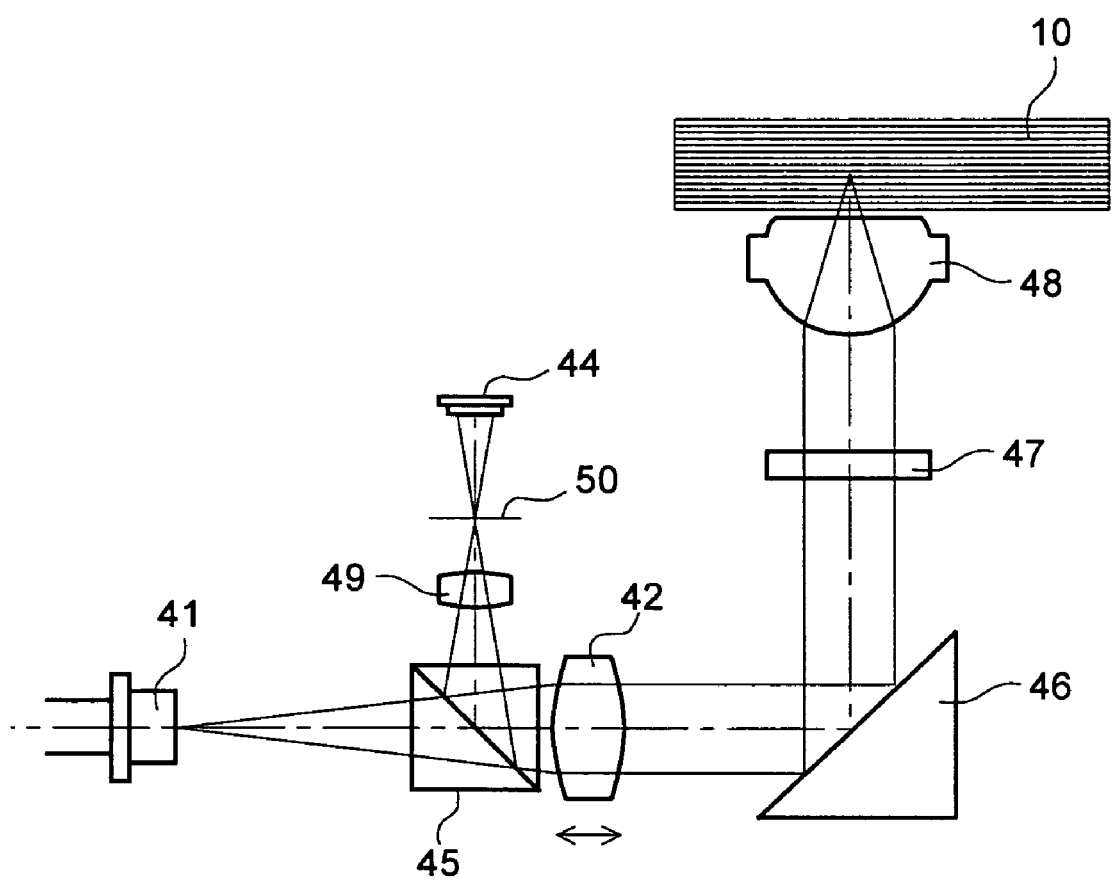
FIG. 13 is a schematic of the internal structure of an optical pickup device.

FIG. 13 is a schematic of an example of the structure of an optical system in the optical pickup 30. As shown in FIG. 13, the optical pickup 30 has a light source 41 that outputs light beams for recording and reproducing, a polarized beam splitter 45 that outputs light beams output from the light source 41 to a spherical aberration compensating lens 42 and outputs return light from the optical media 10 to a detector 44, a spherical aberration compensating lens 42 (corresponding to the spherical aberration compensating unit 42 in FIG. 12) that may move in the optical axis direction to compensate for the spherical aberration of light beams output from the light source 41, a rise prism 46 that polarizes light beams coming from the spherical aberration compensating lens 42 by 90 degrees, a quarter wavelength plate 47, an objective lens 48 that collects incoming light beams to the optical media 10, a light collecting lens 49 that collects return light from the optical media 10 output from the beam splitter 45, a pin hole 50, and a detector 44 (corresponding to the signal detecting unit 44 in FIG. 12) such as for example a known four-division detector that receives return light from the optical media 10.

The recording and reproducing device has a focus servo circuit 51, a tracking servo circuit 52, an LD power adjusting circuit 53, a spherical aberration compensating circuit 54, a replay signal detection processing circuit 55, which may be implemented as a demodulating unit, a memory 56, an operating unit 57, a display unit 58 and a controller 40, which may also be referred to as a controlling unit.

Spherical aberration compensation values, which correspond to the cover layer thickness of the respective recording layers of the optical media 10, are stored previously in the memory 56. The cover layer thickness means the distance from the surface of the optical media 10 at the side of the objective lens 48 to a target recording layer. In the memory 56, spherical aberration compensation values corresponding to the cover layer thickness are stored for the respective recording layers. The operating unit 57 has buttons and the like for carrying out various operations for recording and reproducing. On the display unit 58, various information items are displayed.

The replay signal detection processing circuit 55 generates a focus error signal and a tracking error signal on the basis of the detection signal of return light output from the signal detecting unit (detector) 44, and demodulates and replays record information and outputs the record information as a replay signal. The replay signal detection processing circuit 55 deciphers the spherical aberration precise compensation information, layer identification address information, light strategy information, and optimized recording and reproducing laser output information on the basis of the detection signal of the signal detecting unit 44 at the moment when a light beam is irradiated to the index units W1 to W6 of the optical media 10. The focus error signal, tracking error signal, replay signal, spherical aberration precise compensation information, layer identification address information, light strategy information, and optimized recording and reproducing laser output information and so forth are input to the controller 40.

The controller 40 uses the detection output of the pickup position detecting circuit 32 as feedback information to drive and control the slider servo circuit 33, thereby moving and controlling the optical pickup 30 in the Y direction. The controller 40 also uses the detection output of the media position detecting circuit 36 as feed back information to drive and control the media move servo circuit 37, and moves and controls the optical media 10 in the X direction, thereby controlling the relative position of the optical pickup 30 to the optical media 10 in the X-Y direction. The controller 40 outputs a focus error signal to the focus servo circuit 51, outputs a tracking error signal to the tracking servo circuit 52, and outputs to the LD power adjusting circuit 53 the optimized recording and reproducing laser output information and the light strategy information obtained from the index units. The controller 40 outputs to the spherical aberration compensating circuit 54 the spherical aberration compensation value memorized in the memory 56 and the spherical aberration precise compensation information obtained from the index units. The controller 40 carries out various controls concerning recording and reproducing.

The focus servo circuit 51 executes a focus servo that servo controls the focus actuator of the objective lens driving unit 43 on the basis of the focus error signal input from the controller 40. The focus actuator of the objective lens driving unit 43 changes the position of the objective lens 48 in the direction perpendicular to the surface of the optical media 10 according to the level and polarity of the focus servo signal output from the focus servo circuit 51.

In addition, when the focus servo circuit 51, after completion of reading information at the index units W1 to W6, moves from the index units W1 to W6 to the recording film forming unit 14 and carries recording and reproducing, the focus servo circuit 51 carries out a control so as for the focus servo not to come off by changing the gain of the focus servo into a high value. Thereby, it is possible to maintain the focus servo even in the recording film forming unit 14 whose reflectance ratio is low. Changeover instructions of the focus servo gain are input from the controller 40. The focus servo circuit 51 and the focus actuator of the objective lens driving unit 43 correspond to a focus servo unit.

The tracking servo circuit 52 executes a tracking servo that servo controls the tracking actuator of the objective lens driving unit 43 on the basis of the tracking error signal input from the controller 40. The tracking actuator of the objective lens driving unit 43 changes the radiation position of light beam on the optical media 10 so as to make the objective lens follow the track set in accordance to the level and polarity of the tracking servo signal output from the tracking servo circuit 52.

In addition, when the tracking servo circuit 52, after completion of reading information at the index units W1 to W6, moves from the index units W1 to W6 to the recording film forming unit 14 and carries out recording and reproducing, the tracking servo circuit 52 carries out a control so as for the tracking servo not to come off by changing the gain of the tracking servo into a high value. Thereby, it is possible to maintain the tracking servo even in the recording film forming unit 14 whose reflectance ratio is low. Changeover instructions of the tracking servo gain are input from the controller 40. The tracking servo circuit 52 and the tracking actuator of the objective lens driving unit 43 correspond to a tracking servo unit.

The LD power adjusting circuit 53 controls the power and light strategy of the light source 41 on the basis of the optimized recording and reproducing laser output information and the light strategy information input from the controller 40.

The spherical aberration compensating circuit 54 controls the spherical aberration compensating unit 42 (spherical aberration compensating lens 42) on the basis of the spherical aberration compensation value and the spherical aberration precise compensation information input from the controller 40. The spherical aberration compensating lens 42 shown in FIG. 13 changes the relative position to the objective lens 48 to change the dissipation degree or the convergence degree of an incoming beam of the light beam to the objective lens 48, thereby compensating for the spherical aberration. The spherical aberration compensating lens 42 can be, for example, a collimator lens or an expander lens. Therefore, in this case, the spherical aberration compensating circuit 54 moves the spherical aberration compensating lens 42 in the optical axis direction, thereby compensating for the spherical aberration.

As another example of the spherical aberration compensating unit 42, there is a liquid crystal element panel. As for liquid crystal molecules, when voltage is applied, the direction of liquid crystal molecules changes and the refracting index thereof changes. Accordingly, light that passes through a liquid crystal panel to a part whose area voltage has been applied becomes a transmission wave surface having a specific phase difference only in that area. This phase difference may be controlled by the size of the voltage to be applied. Accordingly, by applying voltage onto the liquid crystal element panel so that a phase difference is formed to set off the wave surface aberration that the light beam that has passed the polarized beam splitter 45, it is possible to compensate for the spherical aberration.

Figure 14:
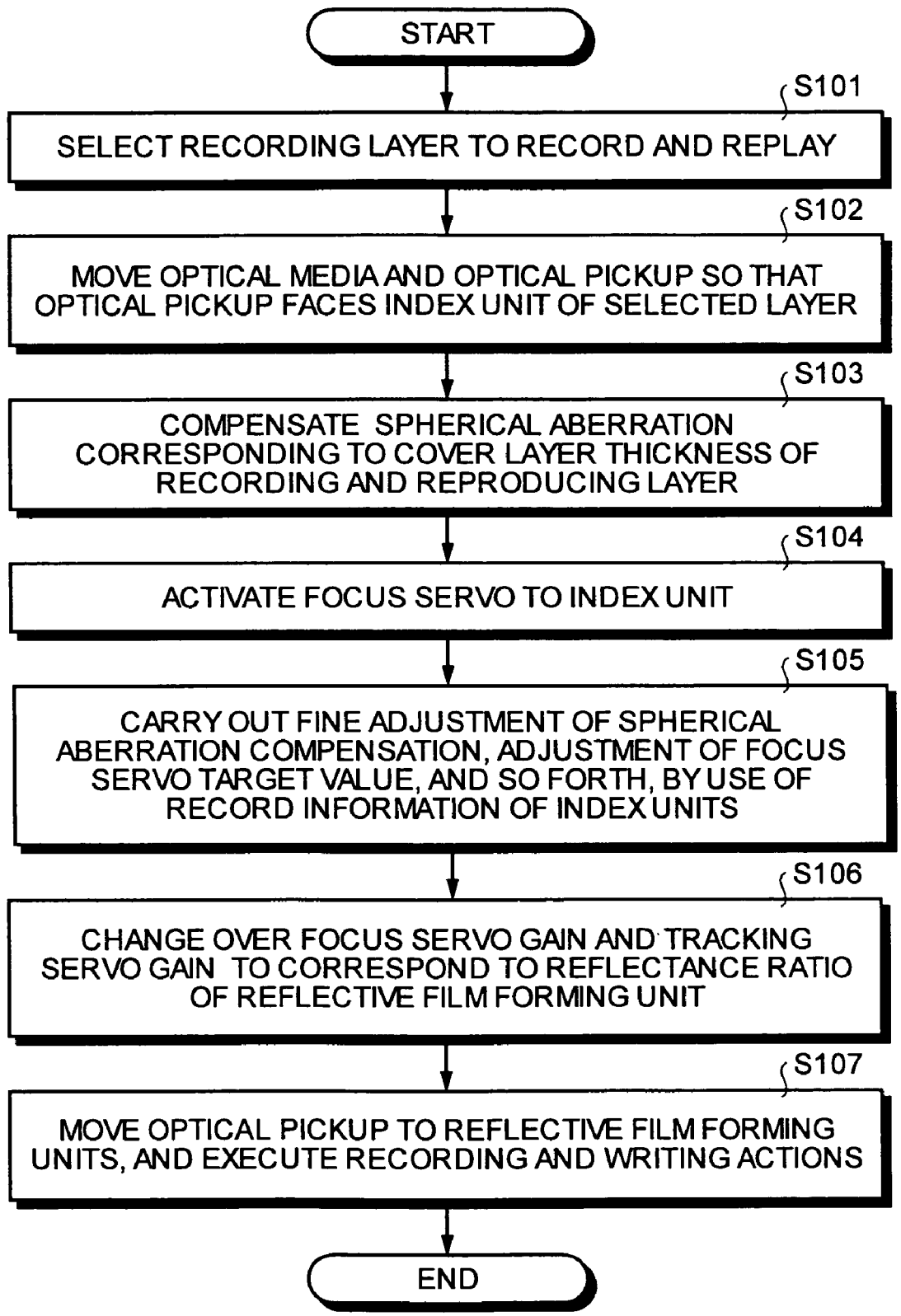
FIG. 14 is a flow chart of a process performed by the recording and reproducing device according to the first embodiment at recording and reproducing.

Next, actions of the recording and reproducing device at recording and reproducing are explained hereinafter in reference to FIG. 14. The controller 40 first selects a recording layer to record and replay from plural recording layers of the optical media 10 (step S101). Then, the controller 40 outputs a move instruction to the media move servo circuit 37 and the slider servo circuit 33, and relatively moves the optical media 10 and the optical pickup 30 in the X-Y directions so that the optical pickup 30 is positioned at the X-Y position where the index unit of the selected recording layer exists (step S102). In the optical media 10, markings or notches for specifying a standard position (not shown) are arranged, and the respective index units W1 to W6 are arranged on the recording layers according to a prescribed rule from this standard position. Therefore, at the recording and reproducing device, if the optical pickup 30 is relatively moved by a specific distance in a specific direction from the standard position, it is possible to make the optical pickup 30 reach the index unit of the target recording layer.

Next, the controller 40 reads the spherical aberration compensation value corresponding to the cover layer thickness of the selected recording layer from the memory 56, and outputs the read spherical aberration compensation value to the spherical aberration compensating circuit 54. The spherical aberration compensating circuit 54 controls the spherical aberration compensating unit 42 of the optical pickup 30 according to the input spherical aberration compensation value, thereby compensating in advance for a spherical aberration that occurs before reaching the target recording layer (selected recording layer) (step S103). By this compensation, it is possible to make a servo loop of a focus servo into a servo close condition in a stable manner.

Next, procedures are performed to activate the focus servo to the index unit of the target recording layer (step S104). In the first embodiment, the reflective film forming units W1 to W6 of the optical media 10 adopt the arrangement method similar to that of the optical media of the embodiment shown in FIG. 4. Accordingly, in the case of an interlayer jump from a certain recording layer to another recording layer adjacent thereto, the focus jump method mentioned previously is adopted. In cases other than the interlayer jump to an adjacent layer, the procedures to activate the normal focus servo are carried out. The focus servo circuit 51 monitors the focus error signal input from the controller 40, and on the basis of this monitoring, the focus servo circuit executes the procedures to activate the focus servo to the index unit of the target recording layer.

At completion of making the servo loop of the focus servo into the servo close condition to the index unit of the target recording layer, the controller 40 reads the information prerecorded in this index unit. In this record information, as mentioned previously, there are layer identification address information, spherical aberration precise compensation information, light strategy information, optimized recording and reproducing output information, and so forth. Then, the controller 40, by use of the read record information, carries out the fine adjustment of spherical aberration compensation, adjustment of focus servo target value, adjustment of recording and reproducing laser output, setting of light strategy pattern and so forth (step S105). In addition, the controller 40, by use of the read layer identification address information, may also confirm on which layer the current layer is located.

At the completion of these fine adjustment processes, the controller 40 moves the optical pickup 30 or the optical media 10 so that the optical pickup 30 should move from the status facing the index unit into the status facing the reflective film forming units 14, and at this moment, the controller 40 changes over the focus servo gain and the tracking servo gain (step S106). Namely, the reflective film forming units 14 has a reflectance ratio lower than that of the index units W1 to W6. Accordingly, the light receiving amount of the optical pickup 30 at the signal detecting unit 44 becomes small. As a result, the possibility increases that the focus servo and the tracking servo may come off.

Therefore, when the controller 40 moves from the index units to the reflective film forming units 14 by giving a specific command to the focus servo circuit 51 and the tracking servo circuit 52, the controller 40 changes the setting of the focus servo gain of the focus servo circuit 51 and the tracking servo gain of the tracking servo circuit 52 into a value larger than the servo gain at the index units (step S106). Namely, the servo gains are changed over so that the focus servo gain and the tracking servo gain at the reflective film forming units 14 become larger than the respective servo gains at the index units W1 to W6. By this changeover setting of the servo gains, even in the reflective film forming units 14 whose reflectance ratio is low, the focus servo and the tracking servo will not come off, and it is possible to maintain the focus servo and the tracking servo.

At the completion of the adjustment of servo gains, the controller 40 moves the optical pickup 30 to a required position of the reflective film forming units 14, and executes recording and reproducing actions (step S107).

Figure 16A:
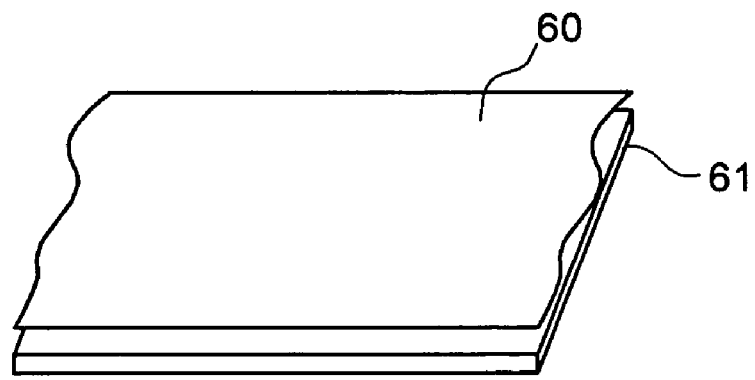
FIGS. 16A to 16F are process charts of the manufacturing procedure of the multilayer optical recording medium according to the first embodiment.

Next, an example of the manufacturing method of a card type optical media 10 is explained hereinafter in reference to FIGS. 16A to 16F. As shown in FIG. 16A, first, an intermediate layer sheet 60 is prepared of a band shape made of photo polymer or the like. The intermediate layer sheet 60 becomes an intermediate layer 13 of the optical media 10 shown in FIG. 10. By use of a stamper 61 having pit shapes in which the layer identification address information, spherical aberration precise compensation information, light strategy information, optimized recording and reproducing laser output information, and so forth are recorded, pit information (concave and convex) is transferred to respective units where the reflective film forming units of the intermediate layer sheet 60 are formed.

Figure 16B:
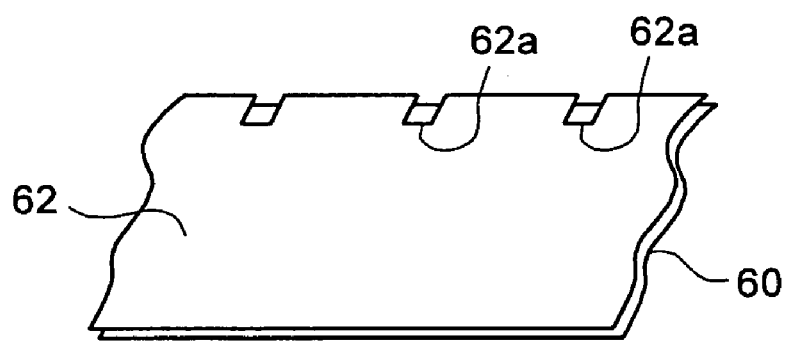

Next, as shown in FIG. 16B, a mask 62 (for example, a metallic mask) for forming a reflection forming film is laminated onto the intermediate layer sheet 60. In this case, on the mask 62, notches 62a are formed at units where reflective film forming units are formed.

Figure 16C:
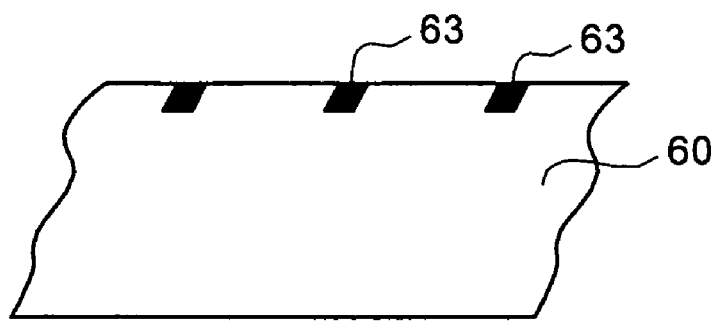

Next, as shown in FIG. 16C, by spattering, reflective film forming units 63 of a metal such as aluminum are deposited on the intermediate layer sheet 60.

Figure 16D:
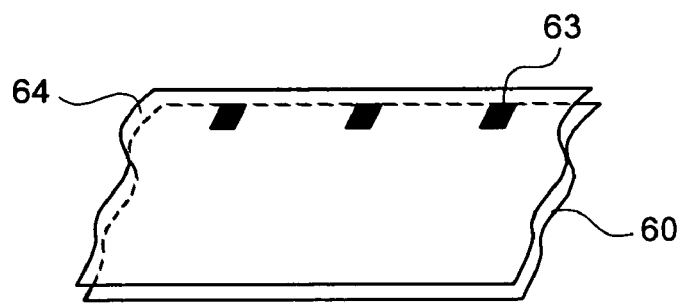

Next, as shown in FIG. 16D, a recording layer sheet 64 made of photo chromic materials or so is attached onto the intermediate layer sheet 60 where the reflective film forming units 63 have been deposited, and the attached recording layer sheet 64 is hardened by use of ultraviolet ray or the like. Thereby, the intermediate layer sheet 60 and the recording layer sheet 64 are joined with each other.

Figure 16E:
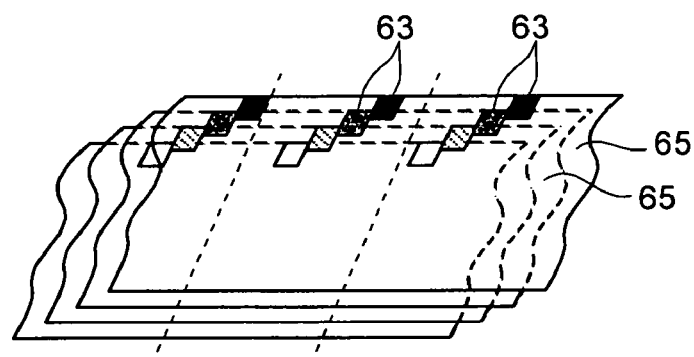

Next, as shown in FIG. 16E, a required number of the sheets 65 are piled in which the intermediate layer sheet 60 and the recording layer sheet 64 have been attached in the previous process. At this moment, piling is made so that the reflective film forming units 63 should not overlap, for example, between the respective recording layers. Of course, by use of the methods explained in FIGS. 1, 4, and 7, the sheets 65 may be piled so as to arrange the reflective film forming units 63 (W1 to Wn) of the respective recording layers. At the completion of the piling processes, the laminated sheets 65 are cut into a specific size.

Figure 16F:
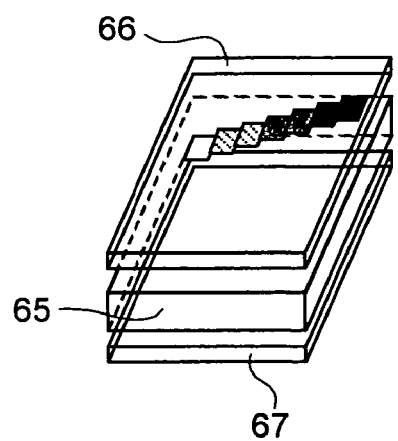

Next, as shown in FIG. 16F, the laminated sheets 65 that have been cut into the specific size are sandwiched by a substrate layer 66 (corresponding to the substrate layer 11 in FIG. 10) and a protection layer 67 (corresponding to the protection layer 12 in FIG. 10) and jointed with them. A card type optical media 10 is then complete.

According to the manufacturing method explained above, it is possible to manufacture card type optical media 10 with a fewer number of processes.

As explained heretofore, according to the card type optical media 10 in accordance with the first embodiment, the index units W1 to W6 of a high reflectance ratio are arranged on the respective recording layers L1 to L6, and for the respective recording layers L1 to L6, the index units W1 to W6 of the adjacent recording layers are arranged so that parts thereof are overlapped when viewed from the side of the optical pickup. As a result, it is possible to easily make a servo loop of a focus servo into a servo close condition, and also to use the focus jump procedures. Further, the layer identification address information, light strategy information, and optimized recording and reproducing laser output information are recorded previously into the index units W1 to W6. Therefore, at the side of the recording and reproducing device, by use of these record information items, it is possible to carry out the fine adjustment of spherical aberration compensation, adjustment of focus servo target value, adjustment of recording and reproducing laser output, setting of light strategy pattern, identification of the current layer, and so forth.

Furthermore, according to the recording and reproducing device of the first embodiment, when moving from the index units to the reflective film forming units, any one of the focus servo gain and the tracking servo gain or both are changed into a value larger than the servo gain at the index units. Accordingly, even in the recording film forming units whose reflectance ratio is low, the focus servo and the tracking servo will not come off, and it is possible to maintain the focus servo and the tracking servo. Furthermore, spherical aberration compensation values corresponding to the cover layer thickness of the respective recording layers of the optical media 10 are stored previously in the memory 56, and by use of the spherical aberration compensation values, spherical aberration compensation is carried out per recording layer. Accordingly it is possible to carry out a highly precise spherical aberration compensation, and also to perform highly precise recording and reproducing in the respective recording layers.

Moreover, according to the recording and reproducing device of the first embodiment, making a servo loop of a focus servo into a servo close condition at the respective recording layers of the optical media 10 is made by use of the index units W1 to Wn of the respective recording layers. Accordingly, it is possible to carry out making a servo loop of a focus servo into a servo close condition to the optical media 10 in simple and precise manners.

Figure 15:
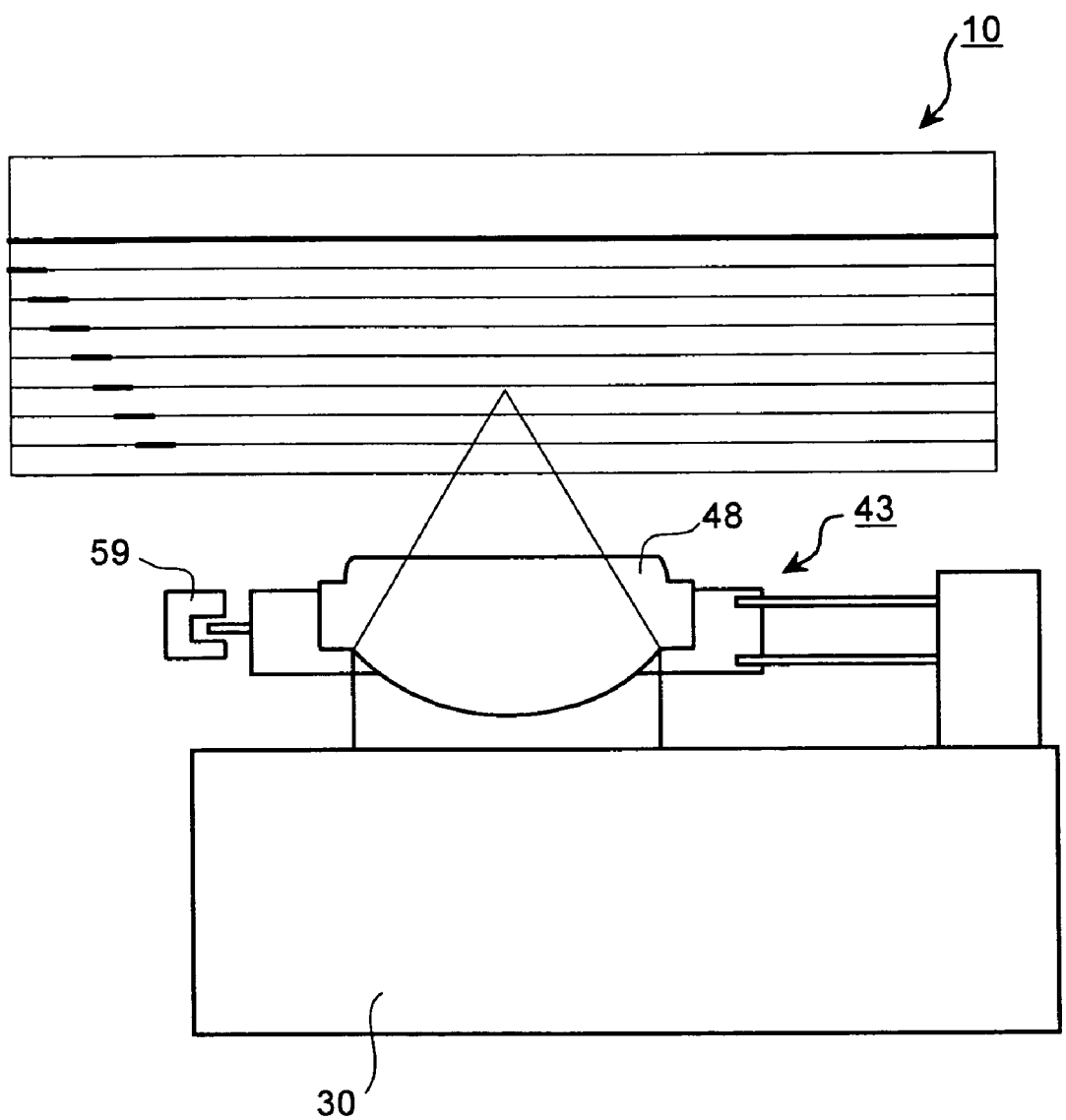
FIG. 15 is a schematic for explaining other controls of the recording and reproducing device according to the first embodiment.

When the thickness error in the respective recording layers of the optical media is very small, without using the focus servo, the objective lens actuator (objective lens driving unit) 43 of the optical pickup 30 may be fixed to the focus direction and controlled, thereby enabling recording and reproducing to be carried out. In this case, as shown in FIG. 15, a position sensor 59 that detects the position of the objective lens 48 in the optical axis direction is loaded to the objective lens driving unit 43 that drives the objective lens 48. The procedures to make a servo loop of a focus servo into a servo close condition to the target recording layer are the same as those mentioned previously, and by use of the index units, the focus servo is activated to the target recording layer. Then, the position of the objective lens 48 in the optical axis direction at the moment when the focus servo has been activated to the target recording layer is memorized. When moving the optical pickup 30 from the index units to the recording film forming unit 14 and carry out recording and reproducing actions, a control is carried out so that, with the memorized position as a target value and by carrying out a feedback control with output as feedback information, the position sensor 59 is fixed to the memorized target position.

In the first embodiment, the optical media 10 is moved in the X direction, and the optical pickup 30 is moved in the Y direction. It is also possible in another structure that the optical media 10 is fixed, and the optical pickup 30 is movable in the X-Y directions.

Next, a second embodiment of the present invention is explained hereinafter in reference to FIGS. 17 to 20 and FIG. 21A to 21F. In the second embodiment, an optical media 70 having a disk shape is employed.

Figure 17:
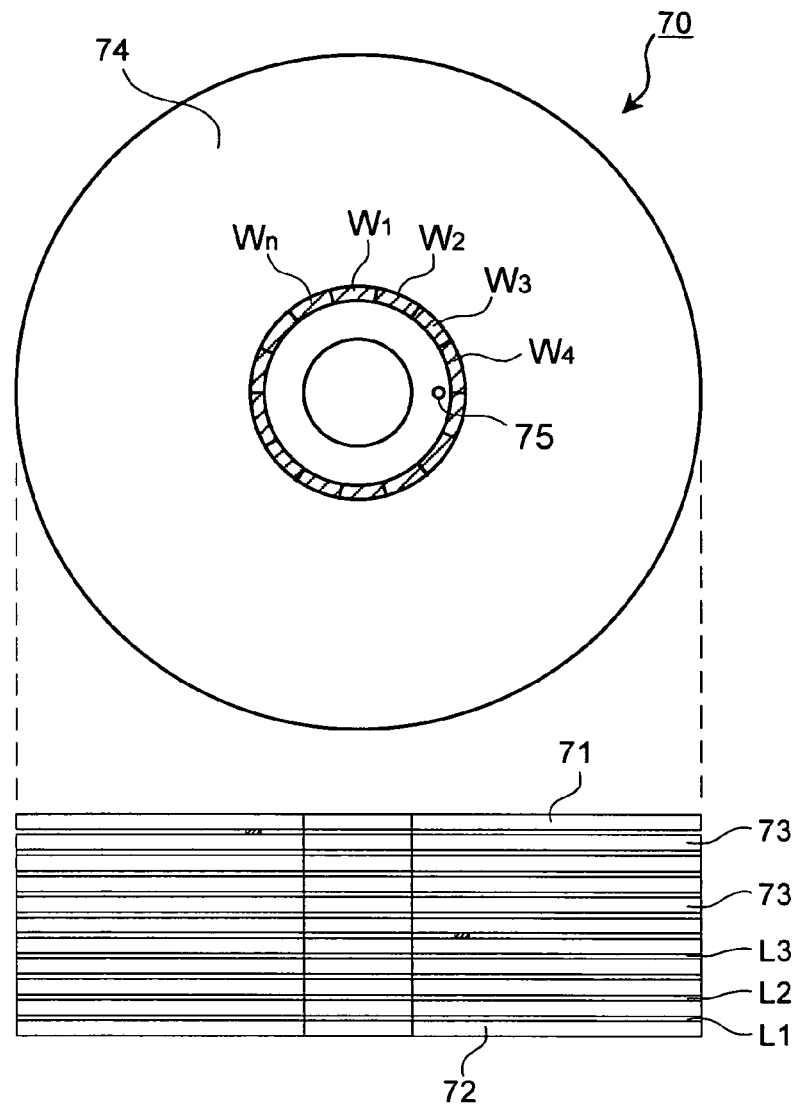
FIG. 17 is a schematic of a disk type optical media as a multilayer optical recording medium according to a second embodiment of the present invention.

FIG. 17 is a schematic of the optical media 70 in the second embodiment. The optical media 70 is structured by laminating many recording layers L1 to Ln and intermediate layers 73 between a substrate layer 71 and a protection layer 72. At the internal circumferential areas of the respective recording layers L1 to L6, reflective film forming units having reflection characteristics of a high reflectance ratio (referred to also as index units) W1 to Wn are formed along the circumferential direction.

In this case, in the further inside of the reflective film forming units W1 to Wn, a positioning unit 75 is formed where a marking to specify the standard position. In the respective recording layers L1 to Ln, the area other than the internal circumferential areas where the reflective film forming units W1 to Wn are formed includes a recording film forming unit 74 where recording and reproducing of information is carried out. The reflective film forming units W1 to Wn have a higher reflectance ratio than that of the recording layer forming unit 74. Because the reflective film forming units W1 to W6 are arranged in the most internal circumferential side of the optical media 70, it is possible to use effectively the recording area of the recording film forming unit 74 of the respective recording layers L1 to Ln.

In the respective index units W1 to W6, in the same manner as in the first embodiment, layer identification address information, various information concerning any one of recording and reproducing or both (spherical aberration precise compensation information, light strategy information, optimized recording and reproducing laser output information) and so forth are memorized. Therefore, by use of this record information, it becomes possible to confirm the recording layers, and finely adjust and set the spherical aberration of the pickup, the focus servo target value and so forth.

Figure 18:
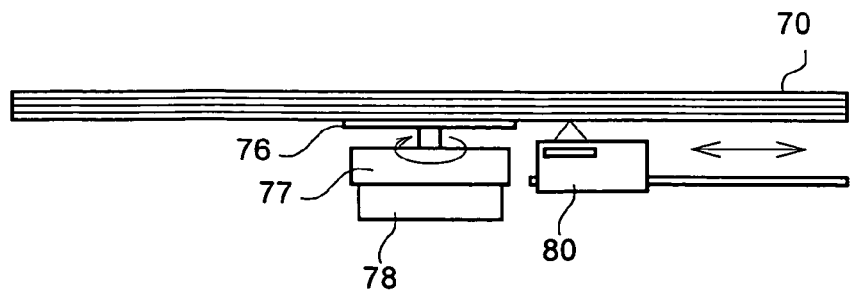
FIG. 18 is a side view of the holding and driving mechanism of a disk type optical media shown in FIG. 17.

FIG. 18 is a schematic of the holding and driving mechanism of a disk type optical media 70 in the recording and reproducing device. The media holding and driving mechanism shown in FIG. 18 has a supporting base 76 that supports the optical media 70, a spindle motor 77 that rotates and drives the supporting base 76, an encoder 78 that detects the rotation position of the spindle motor, and an optical pickup 80 that is driven in the radial direction (tracking direction) of the optical media 70.

Figure 19:
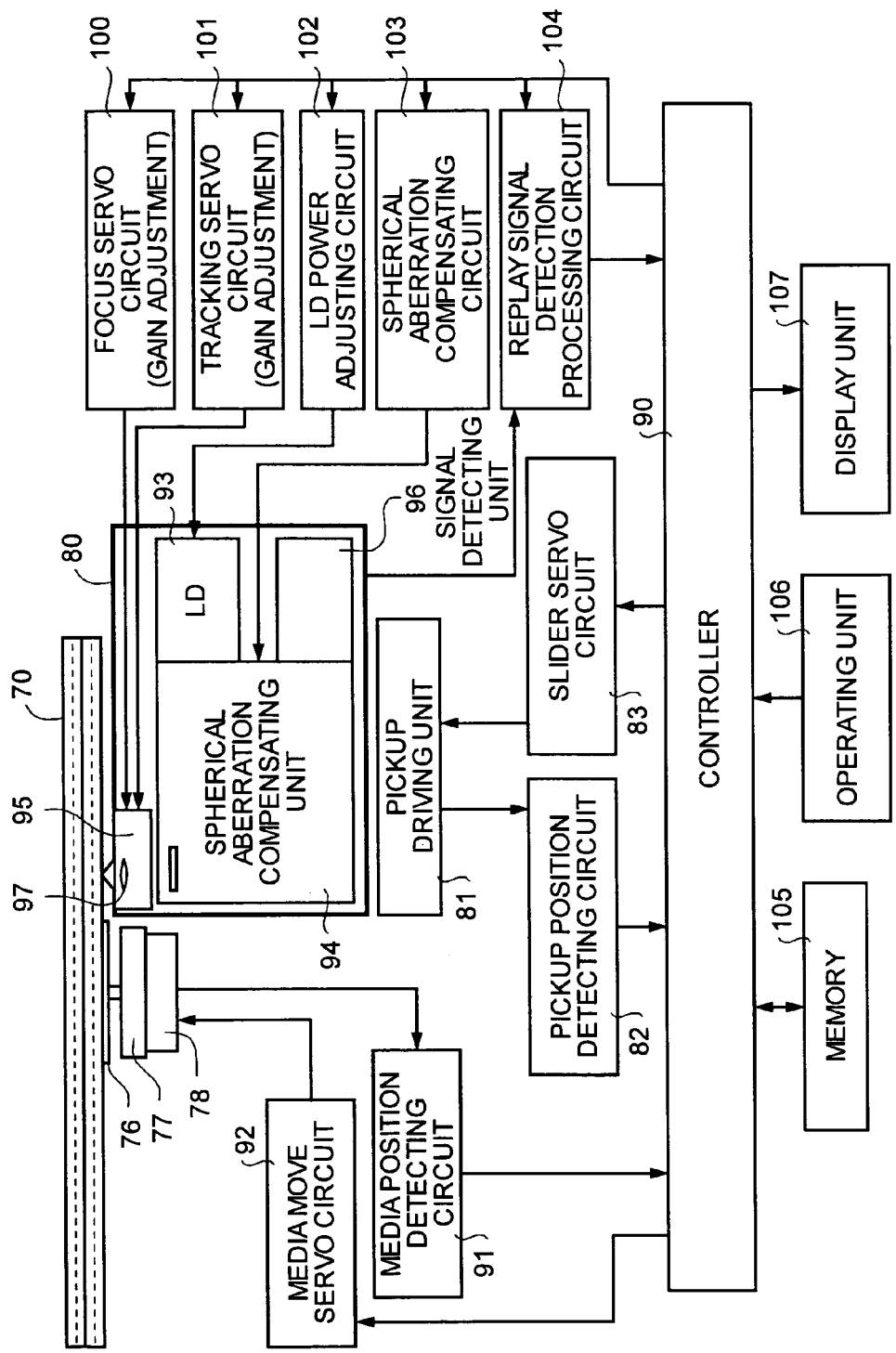
FIG. 19 is a block diagram of a control structure of the recording and reproducing device according to the second embodiment.

FIG. 19 is a block diagram of the entire structure of the recording and reproducing device that records and replays the disk type optical media 70. This recording and reproducing device has an optical pickup 80, a pickup driving unit 81 that drives the optical pickup 80 in the tracking direction, a pickup position detecting circuit 82 that detects the position of the optical pickup 80 in the tracking direction and inputs the detection signal to a controller 90, and a slider servo circuit 83 that servo controls the movement of the optical pickup 80 in the tracking direction according to instructions from a controller 90.

In addition, the recording and reproducing device has a media position detecting circuit 91 that detects the rotation position of optical media 70 on the basis of the detection output of the encoder 78 and inputs the detection signal to the controller 90, and a media move servo circuit 92 that rotates and servo drives the optical media according to instructions from the controller 90.

The optical pickup 80 has a light source 93 such as a laser diode (LD), a spherical aberration compensating unit 94, an objective lens driving unit 95, a signal detecting unit 96, and so forth. The objective lens driving unit 95 has a focus actuator that moves an objective lens 97 in the optical axis direction thereof, and a tracking actuator that moves the objective lens 97 in the tracking direction. The optical pickup 80 has an optical system, for example, one as shown in the previous FIG. 13.

The recording and reproducing device has a focus servo circuit 100, a tracking servo circuit 101, an LD power adjusting circuit 102, a spherical aberration compensating circuit 103, a replay signal detection processing circuit 104, a memory 105, an operating unit 106, a display unit 107, and a controller 90.

In the same manner as in the first embodiment, spherical aberration compensation values corresponding to the cover layer thickness of the respective recording layers are stored in the memory 105. The operating unit 106 has buttons and the like for carrying out various operations for recording and reproducing. On the display unit 107, various information items are displayed.

The replay signal detection processing circuit 104 generates a focus error signal and a tracking error signal on the basis of the detection signal of return light output from the signal detecting unit 96, and demodulates and replays record information and outputs the record information as a replay signal. The replay signal detection processing circuit 104 acquires the spherical aberration precise compensation information, layer identification address information, light strategy information, and optimized recording and reproducing laser output information, on the basis of the detection signal of the signal detecting unit 96 at the moment when a light beam is irradiated to the index units W1 to Wn of the optical media 70. The focus error signal, tracking error signal, replay signal, spherical aberration precise compensation information, layer identification address information, light strategy information, and optimized recording and reproducing laser output information and so forth are input to the controller 90.

The controller 90 uses the detection output of the pickup position detecting circuit 82 as feedback information and drives and controls the slider servo circuit 83, thereby moving and controlling the optical pickup 80 in the tracking direction. The controller 90 also uses the detection output of the media position detecting circuit 91 as feed back information, drives and controls the media move servo circuit 92, and moves and controls the optical media 70, thereby controlling the relative position of the optical pickup 80 to the optical media 70. The controller 90 outputs a focus error signal to the focus servo circuit 100, outputs a tracking error signal to the tracking servo circuit 101, and outputs to the LD power adjusting circuit 102 the optimized recording and reproducing laser output information and the light strategy information obtained from the index units. Further, the controller 90 outputs to the spherical aberration compensating circuit 103 the spherical aberration compensation value memorized in the memory 105 and the spherical aberration precise compensation information obtained from the index units. Further, the controller 90 carries out various controls concerning recording and reproducing.

The focus servo circuit 100 executes a focus servo that servo controls the focus actuator of the objective lens driving unit 95 on the basis of the focus error signal input from the controller 90. The focus actuator of the objective lens driving unit 95 changes the position of the objective lens 97 in the direction perpendicular to the surface of the optical media 70 according to the level and polarity of the focus servo signal output from the focus servo circuit 100.

When the focus servo circuit 100 moves from the index units W1 to Wn to the recording film forming unit 74 and carries recording and reproducing after completion of reading information at the index units W1 to Wn, the focus servo circuit 100 carries out a control so as for the focus servo not to come off by changing the gain of the focus servo into a high value. Thereby, it is possible to maintain the focus servo even in the recording film forming unit 74 whose reflectance ratio is low. Changeover instructions of the focus servo gain are input from the controller 90.

The tracking servo circuit 101 executes a tracking servo that servo controls the tracking actuator of the objective lens driving unit 95 on the basis of the tracking error signal input from the controller 90. The tracking actuator of the objective lens driving unit 95 changes the radiation position of light beam on the optical media 70 so as to make the objective lens 97 follow the track concerned according to the level and polarity of the tracking servo signal output from the tracking servo circuit 101.

When tracking servo circuit 101 moves from the index units W1 to Wn to the recording film forming unit 74 and carries recording and reproducing after completion of reading information at the index units W1 to Wn, the tracking servo circuit 101 carries out a control so as for the tracking servo not to come off by changing the gain of the tracking servo into a high value. Thereby, it is possible to maintain the tracking servo even in the recording film forming unit 74 whose reflectance ratio is low. Changeover instructions of the tracking servo gain are input from the controller 90.

The LD power adjusting circuit 102 controls the power and light strategy of the light source 93 on the basis of the optimized recording and reproducing laser output information and the light strategy information input from the controller 90. The spherical aberration compensating circuit 103 controls the spherical aberration compensating unit 94 on the basis of the spherical aberration compensation value and the spherical aberration precise compensation information input from the controller 90.

Figure 20:
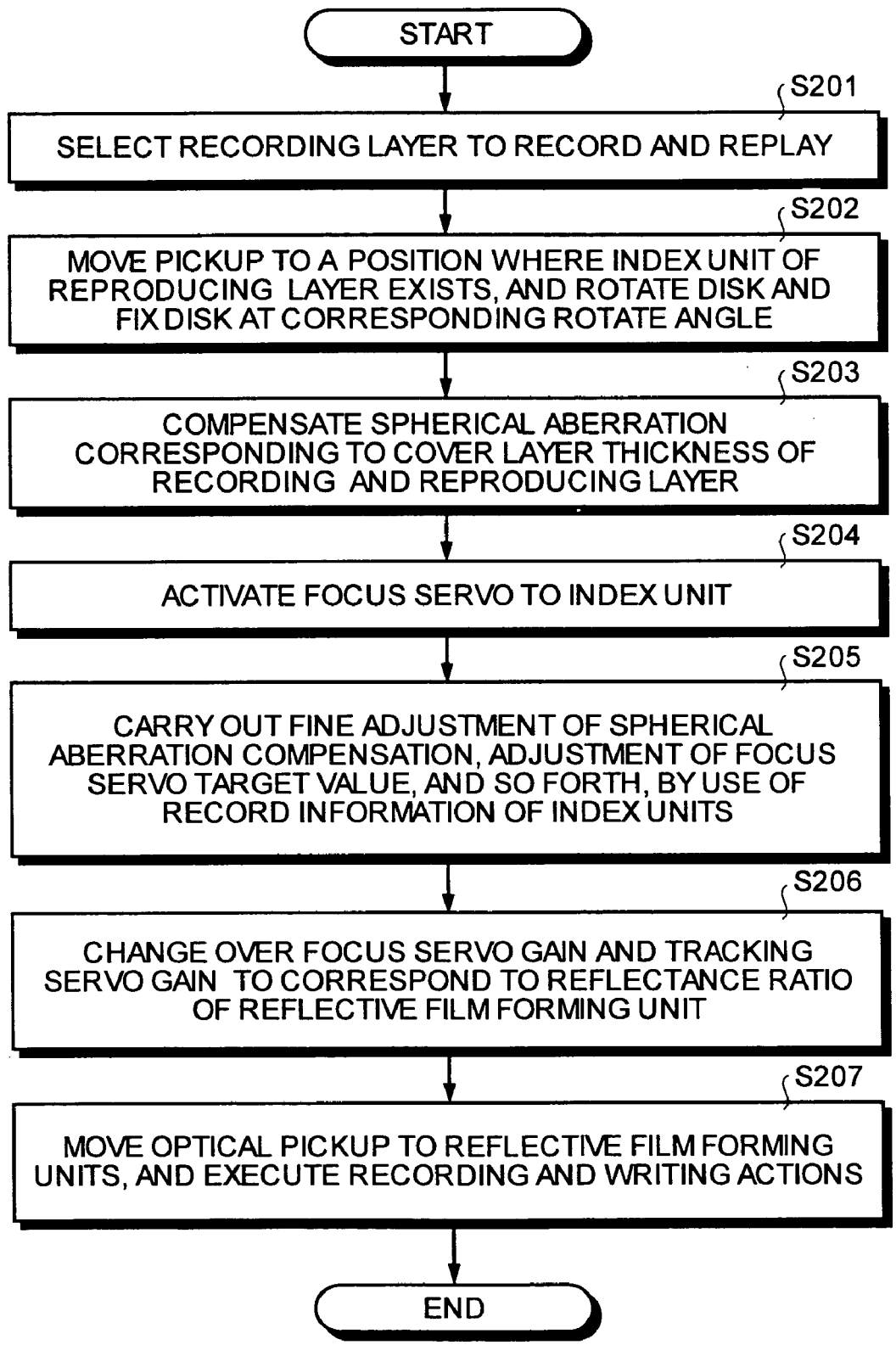
FIG. 20 is a flow chart of a process performed by the recording and reproducing device according to the second embodiment at recording and reproducing.

Next, actions of the recording and reproducing device at recording and reproducing are explained hereinafter in reference to FIG. 20. The controller 90 first selects a recording layer to record and replay from plural recording layers of the optical media 70 (step S201). Then, the controller 90 outputs a move instruction to the slider servo circuit 83, and moves the optical pickup 80 in the tracking direction so that the optical pickup 80 is positioned where the index unit of the selected recording layer exists. The controller 90 outputs a move instruction to the media move servo circuit 92 and rotates the optical media 70 by a required angle and then stops the optical media so that the optical pickup 80 is positioned where the index unit of the selected recording layer exists (step S202). When the control to rotate the optical media 70 by the required angle and then stop the optical media is carried out, the positioning unit 75 formed in the internal circumferential side of the optical media 70 is confirmed, and on the basis of this confirmation, the rotation angle to the required index unit is determined.

Next, the controller 90 reads from the memory 105 the spherical aberration compensation value corresponding to the cover layer thickness of the selected recording layer, and outputs the read spherical aberration compensation value to the spherical aberration compensating circuit 103. The spherical aberration compensating circuit 103 controls the spherical aberration compensating unit 94 of the optical pickup 80 according to the input spherical aberration compensation value, thereby compensating in advance for a spherical aberration that occurs before reaching the target recording layer (step S203). By this compensation, it is possible to make a servo loop of a focus servo into a servo close condition in a stable manner.

Next, procedures are performed to activate the focus servo to the index unit of the target recording layer on the basis of the focus error signal and the like (step S204). At completion of making the servo loop of the focus servo into the servo close condition to the index unit of the target recording layer, the controller 90 reads the information prerecorded in this index unit. In this record information, as mentioned previously, there are layer identification address information, spherical aberration precise compensation information, light strategy information, optimized recording and reproducing laser output information, and so forth. Then, the controller 90, by use of the read record information, carries out the fine adjustment of spherical aberration compensation, adjustment of focus servo target value, adjustment of recording and reproducing laser output, setting of light strategy pattern and so forth (step S205). The controller 90, by use of the read layer identification address information, may also confirm on which layer the current layer is located.

At the completion of these fine adjustment processes, the controller 90 changes over the focus servo gain and the tracking servo gain (step S206). Namely, when the controller 40 moves from the index units to the reflective film forming units 74, by giving a specific command to the focus servo circuit 100 and the tracking servo circuit 101, the controller changes the setting of the focus servo gain of the focus servo circuit 100 and the tracking servo gain of the tracking servo circuit 101 into a value larger than the servo gain at the index units (step S206). By this changeover setting of the servo gains, even in the reflective film forming units 74 whose reflectance ratio is low, the focus servo and the tracking servo will not come off, and it is possible to maintain the focus servo and the tracking servo.

At the completion of the adjustment of servo gains, the controller 90 moves the optical pickup 80 to a required position of the reflective film forming units 74, and executes recording and reproducing actions (step S207).

Figure 21A:
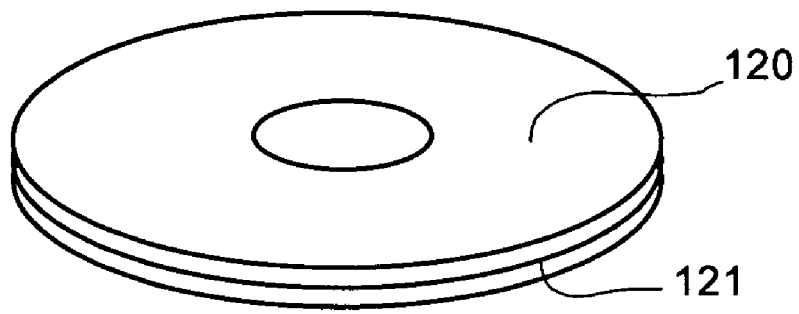
FIGS. 21A to 21F are process charts of the manufacturing procedure of the multilayer optical recording medium according to the second embodiment.

Next, an example of the manufacturing method of a disk type optical media 70 is explained hereinafter in reference to FIG. 21. As shown in FIG. 21A, first, an intermediate layer sheet 120 is prepared having a disk shape made of photo polymer or the like. The intermediate layer sheet 120 corresponds to an intermediate layer 73 of the optical media 70 shown in FIG. 17. By use of a stamper 121 having pit shapes in which are recorded the layer identification address information, spherical aberration precise compensation information, light strategy information, optimized recording and reproducing laser output information, and so forth, pit information (concave and convex) is transferred to the position at the internal circumferential side where the reflective film forming units of the intermediate layer sheet 120 are formed.

Figure 21B:
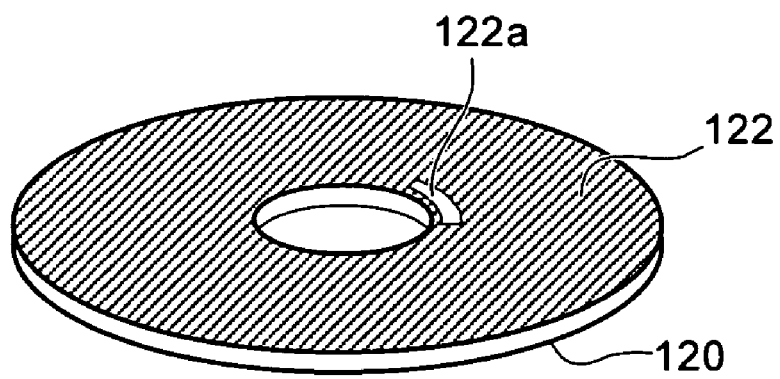

Next, as shown in FIG. 21B, a mask 122 (for example, a metallic mask) for forming a reflection forming film is laminated onto the intermediate layer sheet 120. In this case, on the mask 122, notched holes 122a are formed at the position at the internal circumferential side where reflective film forming units are formed.

Figure 21C:
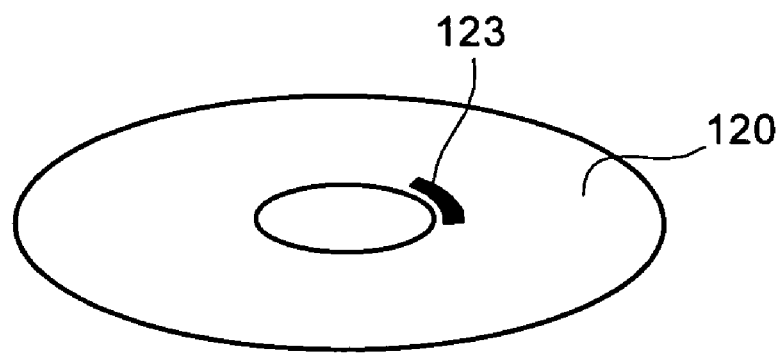

Next, as shown in FIG. 21C, by spattering, reflective film forming units 123 of a metal such as aluminum are deposited on the intermediate layer sheet 120.

Figure 21D:
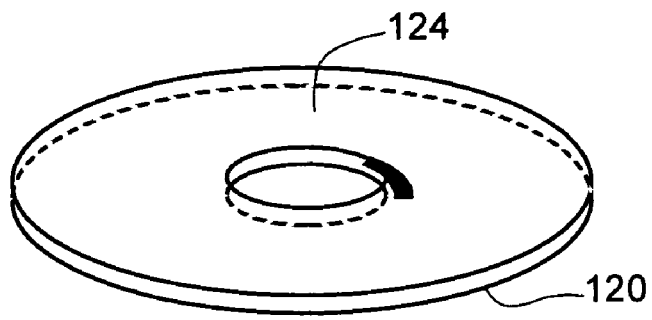

Next, as shown in FIG. 21D, a recording layer sheet 124 made of photo chromic materials or the like is attached onto the intermediate layer sheet 120 where the reflective film forming unit 123 has been deposited, and the attached recording layer sheet 124 is hardened by use of ultraviolet ray or the like. Thereby, the intermediate layer sheet 120 and the recording layer sheet 124 are joined with each other.

Figure 21E:
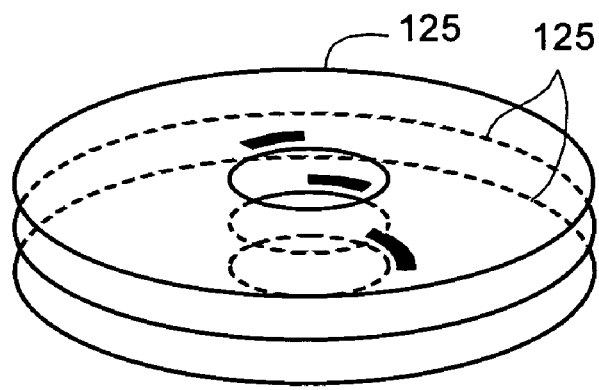

Next, as shown in FIG. 21E, a required number of the sheets 125 are piled in which the intermediate layer sheet 120 and the recording layer sheet 124 have been attached in the previous process. At this moment, piling is made so that the reflective film forming units 123 should not overlap, for example, between the respective recording layers. Of course, by use of the methods explained in FIGS. 1, 4, and 7, the sheets 125 may be piled so as to arrange the reflective film forming units 123 (W1 to Wn) of the respective recording layers.

Figure 21F:
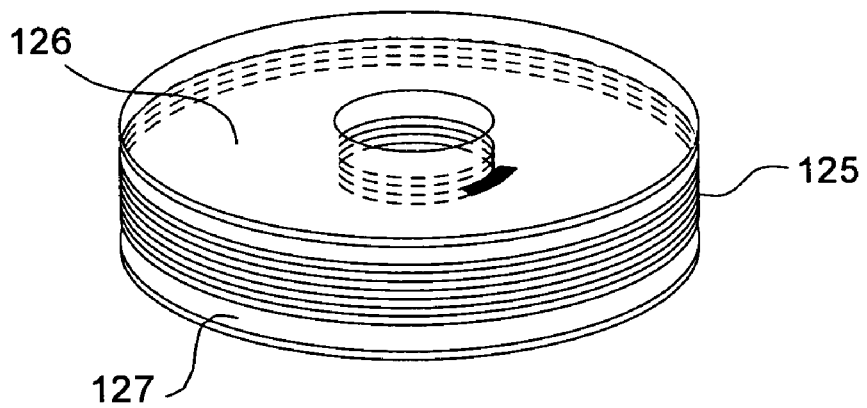

Next, as shown in FIG. 21F, the laminated sheets 125 are sandwiched by a substrate layer 126 (corresponding to the substrate layer 71 in FIG. 17) and a protection layer 127 (corresponding to the protection layer 72 in FIG. 17) and jointed with them. Thereby, a disk type optical media 70 is complete.

According to the manufacturing method explained above, it is possible to manufacture disk type optical media 70 with a fewer number of processes.

As explained heretofore, according to the disk type optical media 70 of the second embodiment, the index units W1 to Wn of a high reflectance ratio are arranged on the respective recording layers L1 to Ln. Accordingly it is possible to execute making the servo loop of the focus servo into the servo close condition in simple and easy manners. Further, as for the respective index units W1 to W6, when the index units W1 to Wn of the adjacent recording layers are arranged so that parts thereof are overlapped when viewed from the side of the optical pickup, it is possible to use the focus jump procedures. Furthermore, the layer identification address information, light strategy information, and optimized recording and reproducing laser output information are recorded previously into the index units W1 to Wn. Therefore, at the side of the recording and reproducing device, by use of these record information items, it is possible to carry out the fine adjustment of spherical aberration compensation, adjustment of focus servo target value, adjustment of recording and reproducing laser output, setting of light strategy pattern, identification of the current layer, and so forth.

Furthermore, according to the recording and reproducing device of the second embodiment, when moving from the index units to the reflective film forming units, any one of the focus gain and the tracking servo gain or both are changed into a value larger than the servo gain at the index units. Accordingly, even in the recording film forming units whose reflectance ratio is low, the focus servo and the tracking servo will not come off, and it is possible to maintain the focus servo and the tracking servo. Still further, spherical aberration compensation values corresponding to the cover layer thickness are stored in the memory 105 per recording layer, and by use of the spherical aberration compensation values, spherical aberration compensation is carried out per recording layer. Accordingly it is possible to carry out a highly precise spherical aberration compensation, and also to perform highly precise recording and reproducing in the respective recording layers.

Moreover, according to the recording and reproducing device of the second embodiment, making the servo loop of the focus servo into the servo close condition at the respective recording layers of the optical media 70 is made by use of the index units W1 to Wn of the respective recording layers. Accordingly, it is possible to carry out making a servo loop of a focus servo into a servo close condition to the optical media 70 in simple and precise manners.

In the recording and reproducing device according to the second embodiment, when the thickness error in the respective recording layers of the optical media 70 is very small, as explained previously in reference to FIG. 15, the objective lens actuator (objective lens driving unit) 95 of the optical pickup 80 is fixed to the focus direction and controlled without using the focus servo. Thereby, recording and reproducing may be carried out.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A multilayer optical recording medium comprising:
    a plurality of recording layers formed as a laminate, each recording layer having a recording layer forming unit on which information is recorded,
    wherein a reflective film forming unit having a higher reflectance ratio than that of the recording layer forming units is formed on a part of each recording layer,
    wherein each recording layer forming unit has a reflectance ratio insufficient to make a servo loop of a focus servo into a servo close condition,
    wherein each reflective film forming unit has a reflectance ratio sufficient to make the servo loop of the focus servo into the servo close condition, and
    wherein each reflective film forming unit is located at a different position and includes a region that does not overlap with any other reflective film forming unit.

2. The multilayer optical recording medium according to claim 1, wherein parts of the reflective film forming units of adjacent recording layers are arranged so as to overlap each other.

3. A multilayer optical recording medium comprising:
    a plurality of recording layers formed as a laminate, each recording layer having a recording layer forming unit on which information is recorded,
    wherein a reflective film forming unit having a higher reflectance ratio than that of the recording layer forming units is formed on a part of each recording layer,
    wherein each recording layer forming unit has a reflectance ratio insufficient to make a servo loop of a focus servo into a servo close condition,
    wherein each reflective film forming unit has a reflectance ratio sufficient to make the servo loop of the focus servo into the servo close condition,
    wherein the respective recording layers are divided into a plurality of groups, each group having more than one recording layer that are continuously adjacent, and wherein the reflective film forming units of recording layers belonging to a same group are arranged at the same position, and reflective film forming units belonging to different groups are arranged at different positions.

4. The multilayer optical recording medium according to claim 1, further comprising a marked position, wherein each of the reflective film forming units is formed at a predetermined distance from the marked position and in a predetermined direction with respect to the marked position.

5. The multilayer optical recording medium according to claim 1, wherein layer identification address information, which shows on which recording layer the reflective film forming unit of concern is located, is pre-recorded in the respective reflective film forming units.

6. The multilayer optical recording medium according to claim 1, wherein information concerning any one of recording and reproducing in the recording layers is pre-recorded in the respective reflective film forming units.

7. The multilayer optical recording medium according to claim 6, wherein the information is at least one of optimal record per recording layer, optimized recording and reproducing laser output information showing replay laser output, light strategy information per recording layer, and spherical aberration precise compensation information showing a spherical aberration compensation amount per multilayer optical recording medium.

8. An optical pickup device that irradiates light from a light source via an objective lens to the multilayer optical recording medium according to claim 1 and receives light reflected from the multilayer optical recording medium using a signal detecting unit, comprising:
a focus servo unit that controls a focus servo of the objective lens on a basis of a focus error signal; and
a controlling unit that controls making the servo loop of the focus servo into the servo close condition in each recording layer of the multilayer optical recording medium by use of the reflective film forming units of the respective recording layers.

9. The optical pickup device according to claim 8, further comprising a spherical aberration compensating unit that carries out a spherical aberration compensation corresponding to a cover layer thickness of the recording layers,
wherein the controlling unit controls the spherical aberration compensating unit to carry out the spherical aberration compensation before the focus servo unit carries out making the servo loop of the focus servo into the servo close condition.

10. The optical pickup device according to claim 9, further comprising a memory pre-stored with spherical aberration compensation information corresponding to the cover layer thickness of the recording layers, and
wherein the spherical aberration compensating unit compensates for spherical aberration by use of the spherical aberration compensation information stored in the memory.

11. An optical pickup device that irradiates light from a light source via an objective lens to the multilayer optical recording medium according to claim 1 and receives light reflected from the multilayer optical recording medium using a signal detecting unit, comprising:
a focus servo unit that controls a focus servo of the objective lens on a basis of a focus error signal;
a tracking servo unit that controls a tracking servo of the objective lens on a the basis of a tracking error signal; and
a controlling unit that changes over a focus servo gain in the focus servo control at the recording layer forming units of the multilayer optical recording medium and a tracking servo gain in the tracking servo control so that the respective servo gains in the focus and tracking servo controls are larger than respective servo gains at the reflective film forming units.

12. An information reproducing device comprising:
an optical pickup device that irradiates light from a light source via an objective lens to the multilayer optical recording medium according to claim 1 and receives light reflected from the multilayer optical recording medium using a signal detecting unit, the optical pickup device having:
a focus servo unit that controls a focus servo of the objective lens on a the basis of a focus error signal; and
a controlling unit that controls making the servo loop of the focus servo into the servo close condition in each recording layer of the multilayer optical recording medium by use of the reflective film forming units of the respective recording layers; and
a demodulating unit that demodulates a detection signal of the signal detecting unit of the optical pickup device.

13. An information reproducing device comprising:
an optical pickup device that irradiates light from a light source via an objective lens to the multilayer optical recording medium according to claim 1 and receives light reflected from the multilayer optical recording medium using a signal detecting unit, the optical pickup device having:
a focus servo unit that controls a focus servo of the objective lens on a basis of a focus error signal;
a tracking servo unit that controls a tracking servo of the objective lens on a basis of a tracking error signal; and
a controlling unit that changes over a focus servo gain in the focus servo control at the recording layer forming units of the multilayer optical recording medium and a tracking servo gain in the tracking servo control so that the respective servo gains in the focus and tracking servo controls are larger than the respective servo gains at the reflective film forming units; and
a demodulating unit that demodulates a detection signal of the signal detecting unit of the optical pickup device.

14. An optical pickup device that irradiates light from a light source via an objective lens to the multilayer optical recording medium according to claim 3 and receives light reflected from the multilayer optical recording medium using a signal detecting unit, comprising:
a focus servo unit that controls a focus servo of the objective lens on a basis of a focus error signal; and
a controlling unit that controls making the servo loop of the focus servo into the servo close condition in each recording layer of the multilayer optical recording medium by use of the reflective film forming units of the respective recording layers.

15. An optical pickup device that irradiates light from a light source via an objective lens to the multilayer optical recording medium according to claim 3 and receives light reflected from the multilayer optical recording medium using a signal detecting unit, comprising:
a focus servo unit that controls a focus servo of the objective lens on a basis of a focus error signal;
a tracking servo unit that controls a tracking servo of the objective lens on a basis of a tracking error signal; and
a controlling unit that changes over a focus servo gain in the focus servo control at the recording layer forming units of the multilayer optical recording medium and a tracking servo gain in the tracking servo control so that the respective servo gains in the focus and tracking servo controls are larger than respective servo gains at the reflective film forming units.

16. An information reproducing device comprising:

an optical pickup device that irradiates light from a light source via an objective lens to the multilayer optical recording medium according to claim 3 and receives light reflected from the multilayer optical recording medium using a signal detecting unit, the optical pickup device having:

a focus servo unit that controls a focus servo of the objective lens on a basis of a focus error signal; and a controlling unit that controls making the servo loop of the focus servo into the servo close condition in each recording layer of the multilayer optical recording medium by use of the reflective film forming units of the respective recording layers; and a demodulating unit that demodulates a detection signal of the signal detecting unit of the optical pickup device.

17. An information reproducing device comprising:

an optical pickup device that irradiates light from a light source via an objective lens to the multilayer optical recording medium according to claim 3 and receives light reflected from the multilayer optical recording medium using a signal detecting unit, the optical pickup device having:

a focus servo unit that controls a focus servo of the objective lens on a basis of a focus error signal;

a tracking servo unit that controls a tracking servo of the objective lens on a basis of a tracking error signal; and a controlling unit that changes over a focus servo gain in the focus servo control at the recording layer forming units of the multilayer optical recording medium and a tracking servo gain in the tracking servo control so that the respective servo gains in the focus and tracking servo controls are larger than the respective servo gains at the reflective film forming units; and a demodulating unit that demodulates a detection signal of the signal detecting unit of the optical pickup device.

* * * * *